US010873208B2

(12) United States Patent
Mondal

(10) Patent No.: US 10,873,208 B2
(45) Date of Patent: Dec. 22, 2020

(54) TRANSFORMERLESS MULTI-LEVEL MEDIUM-VOLTAGE UNINTERRUPTABLE POWER SUPPLY (UPS) SYSTEMS AND METHODS

(71) Applicant: Inertech IP LLC, Danbury, CT (US)

(72) Inventor: Subrata K. Mondal, South Windsor, CT (US)

(73) Assignee: INERTECH IP LLC, Plano, TX (US)

( * ) Notice: Subject to any disclaimer, the term of this patent is extended or adjusted under 35 U.S.C. 154(b) by 155 days.

(21) Appl. No.: 15/991,700

(22) Filed: May 29, 2018

(65) Prior Publication Data

US 2019/0140476 A1 May 9, 2019

Related U.S. Application Data

(60) Division of application No. 14/594,073, filed on Jan. 9, 2015, now Pat. No. 9,985,473, which is a
(Continued)

(51) Int. Cl.
| | |
|---|---|
| *H02M 7/00* | (2006.01) |
| *H02J 9/06* | (2006.01) |
| *H02M 3/156* | (2006.01) |

(52) U.S. Cl.
CPC .............. *H02J 9/062* (2013.01); *H02M 3/156* (2013.01); *Y10T 307/549* (2015.04)

(58) Field of Classification Search
CPC ...... H02J 9/062; H02M 3/156; Y10T 307/549
(Continued)

(56) References Cited

U.S. PATENT DOCUMENTS

| | | |
|---|---|---|
| 5,200,644 A | 4/1993 | Kobayashi et al. |
| 5,343,079 A | 8/1994 | Mohan et al. |

(Continued)

FOREIGN PATENT DOCUMENTS

| | | |
|---|---|---|
| AU | 2010256688 A1 | 1/2012 |
| CN | 101442893 A | 5/2009 |

(Continued)

OTHER PUBLICATIONS

Clark, Jeff, "Raising Data Center Power Density," 2013 [retrieved on Jan. 23, 2017] Retrieved from the Internet , 5 pgs.
(Continued)

*Primary Examiner* — Ryan Jager
(74) *Attorney, Agent, or Firm* — Weber Rosselli & Cannon LLP

(57) ABSTRACT

Systems and methods for supplying power at a medium voltage from an uninterruptible power supply (UPS) to a load without using a transformer are disclosed. The UPS includes an energy storage device, a single stage DC-DC converter or a two-stage DC-DC converter, and a multi-level inverter, each of which are electrically coupled to a common negative bus. The DC-DC converter may include two stages in a unidirectional or bidirectional configuration. One stage of the DC-DC converter uses a flying capacitor topology. The voltages across the capacitors of the flying capacitor topology are balanced and switching losses are minimized by fixed duty cycle operation. The DC-DC converter generates a high DC voltage from a low or high voltage energy storage device such as batteries and/or ultra-capacitors. The multi-level, neutral point, diode-clamped inverter converts the high DC voltage into a medium AC voltage using a space vector pulse width modulation (SVPWM) technique. The UPS may also include a small filter to remove harmonics in the AC voltage output from the multi-level inverter.

6 Claims, 12 Drawing Sheets

Related U.S. Application Data continuation of application No. PCT/US2013/049818, filed on Jul. 9, 2013.

(60) Provisional application No. 61/670,057, filed on Jul. 10, 2012, provisional application No. 61/669,665, filed on Jul. 9, 2012.

(58) Field of Classification Search
USPC .................................................. 307/52
See application file for complete search history.

(56) References Cited

U.S. PATENT DOCUMENTS

| | | |
|---|---|---|
| 5,612,580 A | 3/1997 | Janonis et al. |
| 5,818,379 A | 10/1998 | Kim |
| 6,116,048 A | 9/2000 | Hebert |
| 6,160,722 A | 12/2000 | Thommes et al. |
| 6,201,720 B1 | 3/2001 | Tracy et al. |
| 6,374,627 B1 | 4/2002 | Schumacher et al. |
| 6,404,655 B1 | 6/2002 | Welches |
| 6,574,104 B2 | 6/2003 | Patel et al. |
| 6,640,561 B2 | 11/2003 | Trecate et al. |
| 6,772,604 B2 | 8/2004 | Bash et al. |
| 6,826,922 B2 | 12/2004 | Patel et al. |
| 6,859,366 B2 | 2/2005 | Fink |
| 6,879,053 B1 | 4/2005 | Welches et al. |
| 6,924,993 B2 | 8/2005 | Stancu et al. |
| 6,950,321 B2 | 9/2005 | Stancu et al. |
| 6,980,433 B2 | 12/2005 | Fink |
| 7,046,514 B2 | 5/2006 | Fink et al. |
| 7,106,590 B2 | 9/2006 | Chu et al. |
| 7,173,820 B2 | 2/2007 | Fink et al. |
| 7,406,839 B2 | 8/2008 | Bean et al. |
| 7,418,825 B1 | 9/2008 | Bean, Jr. |
| 7,477,514 B2 | 1/2009 | Campbell et al. |
| 7,569,954 B2 | 8/2009 | Tolle et al. |
| 7,660,116 B2 | 2/2010 | Claassen et al. |
| 7,660,121 B2 | 2/2010 | Campbell et al. |
| 7,684,193 B2 | 3/2010 | Fink et al. |
| 7,706,163 B2 * | 4/2010 | Tan ................... H02M 7/487 363/132 |
| 7,730,731 B1 | 6/2010 | Bash et al. |
| 7,738,251 B2 | 6/2010 | Clidaras et al. |
| 7,804,687 B2 | 9/2010 | Copeland et al. |
| 7,855,890 B2 | 12/2010 | Kashirajima et al. |
| 7,864,527 B1 | 1/2011 | Whitted |
| 7,881,057 B2 | 2/2011 | Fink et al. |
| 7,903,404 B2 | 3/2011 | Tozer et al. |
| 7,903,409 B2 | 3/2011 | Patel et al. |
| 7,907,406 B1 | 3/2011 | Campbell et al. |
| 7,957,144 B2 | 6/2011 | Goettert et al. |
| 7,963,119 B2 | 6/2011 | Campbell et al. |
| 8,000,103 B2 | 8/2011 | Lipp et al. |
| 8,031,468 B2 | 10/2011 | Bean, Jr. et al. |
| 8,093,746 B2 | 1/2012 | Murali et al. |
| 8,118,084 B2 | 2/2012 | Harvey |
| 8,120,916 B2 | 2/2012 | Schmidt et al. |
| 8,146,374 B1 | 4/2012 | Zien |
| 8,184,435 B2 | 5/2012 | Bean, Jr. et al. |
| 8,189,334 B2 | 5/2012 | Campbell et al. |
| 8,199,504 B2 | 6/2012 | Kashirajima et al. |
| 8,208,258 B2 | 6/2012 | Campbell et al. |
| 8,212,401 B2 | 7/2012 | Linkhart et al. |
| 8,218,322 B2 | 7/2012 | Clidaras et al. |
| 8,261,565 B2 | 9/2012 | Borror et al. |
| 8,289,710 B2 | 10/2012 | Spearing et al. |
| 8,294,297 B2 | 10/2012 | Linkhart et al. |
| 8,297,069 B2 | 10/2012 | Novotny et al. |
| 8,320,125 B1 | 11/2012 | Hamburgen et al. |
| 8,351,200 B2 | 1/2013 | Arimilli et al. |
| 8,387,687 B2 | 3/2013 | Baer |
| 8,392,035 B2 | 3/2013 | Patel et al. |
| 8,405,977 B2 | 3/2013 | Lin |
| 8,432,690 B2 | 4/2013 | Fink et al. |
| 8,456,840 B1 | 6/2013 | Clidaras et al. |
| 8,457,938 B2 | 6/2013 | Archibald et al. |
| 8,472,182 B2 | 6/2013 | Campbell et al. |
| 8,514,575 B2 | 8/2013 | Goth et al. |
| 8,583,290 B2 | 11/2013 | Campbell et al. |
| 8,689,861 B2 | 4/2014 | Campbell et al. |
| 8,730,691 B2 * | 5/2014 | Paatero ................ H02M 7/487 363/131 |
| 8,760,863 B2 | 6/2014 | Campbell et al. |
| 8,763,414 B2 | 7/2014 | Carlson et al. |
| 8,780,555 B2 | 7/2014 | Fink et al. |
| 8,783,052 B2 | 7/2014 | Campbell et al. |
| 8,797,740 B2 | 8/2014 | Campbell et al. |
| 8,816,533 B2 | 8/2014 | Navarro et al. |
| 9,214,874 B2 * | 12/2015 | Kolhatkar ............ H02M 7/487 |
| 9,793,752 B1 | 10/2017 | Morales et al. |
| 9,912,251 B2 * | 3/2018 | Mondal ................... H02J 9/061 |
| 10,014,713 B1 | 7/2018 | Nguyen |
| 10,033,220 B1 | 7/2018 | Nguyen |
| 2002/0014802 A1 | 2/2002 | Cratty |
| 2002/0172007 A1 | 11/2002 | Pautsch |
| 2003/0061824 A1 | 4/2003 | Marsala |
| 2003/0076696 A1 | 4/2003 | Tsai |
| 2004/0084965 A1 | 5/2004 | Welches et al. |
| 2004/0184232 A1 | 9/2004 | Fink |
| 2005/0162137 A1 | 7/2005 | Tracy et al. |
| 2005/0200205 A1 | 9/2005 | Winn et al. |
| 2005/0231039 A1 | 10/2005 | Hunt |
| 2006/0061334 A1 | 3/2006 | Pollack et al. |
| 2006/0221523 A1 | 10/2006 | Colombi et al. |
| 2006/0245216 A1 * | 11/2006 | Wu ...................... H02M 7/487 363/13 |
| 2007/0008745 A1 | 1/2007 | Joshi et al. |
| 2007/0064363 A1 | 3/2007 | Nielsen et al. |
| 2007/0182383 A1 | 8/2007 | Park et al. |
| 2007/0210652 A1 | 9/2007 | Tracy et al. |
| 2007/0227710 A1 | 10/2007 | Belady et al. |
| 2008/0088183 A1 | 4/2008 | Eckroad et al. |
| 2008/0130332 A1 | 6/2008 | Taimela et al. |
| 2008/0239775 A1 * | 10/2008 | Oughton ............. H02M 5/4585 363/134 |
| 2008/0304300 A1 | 12/2008 | Raju et al. |
| 2009/0019137 A1 | 1/2009 | Mishra et al. |
| 2009/0019535 A1 | 1/2009 | Mishra et al. |
| 2009/0021081 A1 * | 1/2009 | Jacobson ................ H02M 1/42 307/77 |
| 2009/0021082 A1 | 1/2009 | Loucks et al. |
| 2009/0034304 A1 | 2/2009 | Engel et al. |
| 2009/0051344 A1 | 2/2009 | Lumsden |
| 2009/0086428 A1 | 4/2009 | Campbell et al. |
| 2009/0154096 A1 | 6/2009 | Iyengar et al. |
| 2009/0212631 A1 | 8/2009 | Taylor et al. |
| 2009/0302616 A1 | 12/2009 | Peterson |
| 2009/0315404 A1 | 12/2009 | Cramer et al. |
| 2010/0008105 A1 * | 1/2010 | Mallwitz ........... H02M 3/33523 363/16 |
| 2010/0032142 A1 | 2/2010 | Copeland et al. |
| 2010/0094472 A1 | 4/2010 | Woytowitz et al. |
| 2010/0136895 A1 | 6/2010 | Sgro |
| 2010/0188869 A1 * | 7/2010 | Fredette .................. H02M 1/10 363/15 |
| 2010/0201194 A1 | 8/2010 | Masciarelli et al. |
| 2010/0207463 A1 | 8/2010 | Fortmann et al. |
| 2010/0264882 A1 | 10/2010 | Hartular et al. |
| 2010/0300650 A1 | 12/2010 | Bean, Jr. |
| 2011/0141786 A1 * | 6/2011 | Shen .................... H02M 7/487 363/131 |
| 2011/0198057 A1 | 8/2011 | Lange et al. |
| 2011/0265983 A1 | 11/2011 | Pedersen |
| 2011/0278934 A1 | 11/2011 | Ghosh et al. |
| 2011/0313576 A1 | 12/2011 | Nicewonger |
| 2012/0019230 A1 | 1/2012 | Frisch et al. |
| 2012/0103591 A1 | 5/2012 | Tozer |
| 2012/0174612 A1 | 7/2012 | Madara et al. |
| 2014/0009988 A1 | 1/2014 | Valiani |
| 2014/0152109 A1 | 6/2014 | Kanakasabai et al. |
| 2014/0368043 A1 | 12/2014 | Colombi et al. |

(56) References Cited

U.S. PATENT DOCUMENTS

| | | | |
|---|---|---|---|
| 2015/0021998 A1* | 1/2015 | Trescases | H02J 3/385 |
| | | | 307/46 |
| 2015/0035358 A1 | 2/2015 | Linkhart et al. | |
| 2015/0155712 A1* | 6/2015 | Mondal | H02J 3/1857 |
| | | | 307/23 |
| 2015/0188362 A1 | 7/2015 | Mondal et al. | |
| 2016/0294188 A1 | 10/2016 | Stiefenhofer | |
| 2017/0028859 A1 | 2/2017 | Kang et al. | |
| 2018/0269782 A1* | 9/2018 | Mondal | H02M 3/155 |

FOREIGN PATENT DOCUMENTS

| | | |
|---|---|---|
| CN | 100584168 | 1/2010 |
| CN | 101686629 A | 3/2010 |
| CN | 102334396 A | 1/2012 |
| CN | 102461357 A | 5/2012 |
| DE | 102012218873 A1 | 5/2013 |
| EP | 1604263 A2 | 12/2005 |
| EP | 2722978 A2 | 4/2014 |
| JP | 2008287733 A | 11/2008 |
| JP | 5113203 B2 | 1/2013 |
| JP | 5209584 B2 | 6/2013 |
| JP | 5243929 B2 | 7/2013 |
| JP | 5244058 B2 | 7/2013 |
| JP | 5301009 B2 | 9/2013 |
| JP | 5308750 B2 | 10/2013 |
| WO | 2014011706 A1 | 1/2014 |
| WO | 2015020868 A1 | 2/2015 |

OTHER PUBLICATIONS

Doug Garday et al., :Air-Cooled High-Performance Data Centers: Case Studies and Best Methods, White Paper Intel Information Technology, Nov. 2006.

HP Modular Cooling System User Guide, Hewlett-Packard Development Company, Feb. 2007.

Kant et al., "Data Center Evolution a Tutorial on State of the Art, Issues, and Challenges", Computer Networks 53 ( 2009), 2939-2965.

Liebert Xtreme Density—System Design Manual, 2009.

Miller, Troy, "Smart grid solutions for data centers (can you say "self-healing?")," 2013 [retrieved on May 6, 2015] Retrieved from the Internet , 2 pgs.

PCT International Search Report and Written Opinion for PCT/US2015/056785 dated Feb. 2, 2016.

Reduced-Order Modeling of Multiscale Turbulent Convection: Application to Data Center Thermal Management, May 2006.

S&C Electric Co., "Solutions for Data Centers," 2015 [retrieved on Mar. 14, 2015] Retrieved from the Internet , 1 pg.

* cited by examiner

TRANSFORMERLESS MULTI-LEVEL MEDIUM-VOLTAGE UNINTERRUPTABLE POWER SUPPLY (UPS) SYSTEMS AND METHODS

BACKGROUND

1. Technical Field

The present disclosure generally relates to uninterruptible power supplies. More particularly, the present disclosure relates to compact uninterruptible power supplies that use a multi-level two stage dc-dc converter and a multi-level inverter to supply power from an energy storage device.

2. Background of Related Art

There is large demand for data centers to store data due to the emergence of Web-2.0-enabled businesses in the financial, e-commerce, pharmaceutical, and multi-media industries. The digital storage market doubles every 18 months, which translates to an annual growth rate of approximately 150% for the next 5 years. Computer equipment manufacturers continue to expand their data collection and storage capabilities of their servers, which are widely used in data centers across the world. This expansion has led to an increase in the total power requirements of data centers both while connected to an electrical utility and during an interruption in power from the electrical utility. In particular, data centers now demand power in the megawatt range and voltage in the kilovolt range. As a result, data centers require uninterruptible power supplies (UPSs) that can meet these high power and high voltage requirements when there is an interruption in the power supplied from the electrical utility.

Over the past ten years, the cost of copper has increased approximately 400% (from about $0.77/lb to about $4/lb). By using medium voltage (6.6 kV or 13.8 kV) distribution, it is possible to reduce the size of the copper power supply cables, thereby reducing the cost of the power supply cables. It is also possible to reduce the critical power losses between the utility grid and the server computer rack by under 5% by using a transformerless medium voltage (MV) UPS and using a MV distribution system.

In boost mode, the DC-DC converter for the energy storage device of a UPS may use a single power semiconductor device to step up the voltage provided by the energy storage device, e.g., a battery, in the UPS. However, a single power semiconductor device is not available to step up the output voltage of the UPS so that it can connect across medium-voltage lines, for example, 6.6 kV or 13.8 kV AC lines. Therefore, the AC output of UPSs typically uses a step up transformer to step up a voltage of a battery. For example, the transformer may step up the voltage of a battery at 700 V DC or some other low voltage to the AC voltage of the power supplied by the utility supply, for example, 13.8 kV or some other medium voltage.

FIG. 1 shows a system 100 for supplying power to information technology (IT) and/or mechanical load 155 according to the prior art. The system 100 includes a utility/generator power supply system 195 and a UPS 115 that includes a step-up transformer 140. Under normal load conditions, power is supplied to the load 155 entirely by the utility supply 165. The utility supply 165 supplies an AC voltage ranging from about 3.3 kV to about 13.8 kV. The mechanical portion of the load 155 includes electrical power required to operate cooling equipment required to remove waste heat generated by the IT portion of the load 155.

A surge protector 180 is used to limit voltage spikes in the power supplied by the utility supply 165. A bypass line 162 allows maintenance tasks or other work to be performed on system 171-173 when ON/OFF switch of bypass line 162 (not shown) is closed and a static transfer switch (STS) 175 is opened. Line filters 170 are coupled to each AC line 171, 172, and 173 to reduce harmonics in the power supplied by the generator 160 or the utility supply 165. The STS 175 supplies power to a step-down transformer 150 when the STS 175 is closed. The step-down transformer 150 can convert the medium voltage supplied by the utility supply 165, e.g., 13.8 kV, to a low voltage, e.g., 400 V. The low voltage is then supplied to the load 155 having an appropriate current level.

When an interruption or disturbance in the power supplied by the utility supply 165 is detected, the STS 175 opens and the UPS system 115 starts supplying about 100% of the power to the load 155 via the UPS's transformer 140. The UPS system 115 can supply power to the load 155 for a short period, e.g., approximately five minutes, but generally the generator 160 starts generating power if the interruption is more than a few seconds.

The UPS system 115 generates power from a low-voltage energy storage device 105, e.g., one or more low density lead-acid batteries B. The low voltage VB of the energy storage device 105 can range from about 300 V to about 600 V. The low voltage is then converted to a high voltage, e.g., approximately 700 V, by a bidirectional DC-DC converter 110. The bidirectional DC-DC converter 110 includes one stage for converting the low voltage DC to a high voltage DC. The high voltage DC is then converted to a low AC voltage, e.g., approximately 400 V, using a two-level inverter 120.

The AC voltage output from the two-level inverter 120 passes through filter 130, such as an inductor-capacitor (LC) filter, to a step-up transformer 140. The step-up transformer 140 converts the low AC voltage to a medium AC voltage, e.g., about 13.8 kV. The medium AC voltage output from the step-up transformer 140 is then provided to the step-down transformer 150, which converts the medium AC voltage to a low AC voltage, e.g., about 400 V, that is appropriate for the load 155.

Once the generator 160 has reached its reference speed and stabilized, transfer switch 190 shifts the primary power source from the utility supply 165 to the generator 160. During this shift, the output voltage of the UPS system 115 is synchronized to be in phase with the output voltage of the generator 160. Once the STS 175 is closed, a soft transfer from the UPS system 115 to the generator 160 is executed until the load 155 is entirely powered by the generator 160. The energy storage device 105 of the UPS system 115 is then recharged by the power generated by the generator 160.

After the power interruption or disturbance ends, the load 155 is shifted from the generator 160 to the UPS system 115 because the utility supply 165 may be out of phase with the generator 160 and the STS 175 shifts the primary power source to the utility supply 165. The output voltage of the UPS system 115 is then synchronized to be in phase with the output voltage of the utility supply 165. Once the output voltage of the UPS system 115 and utility supply 165 are synchronized, the load 155 is quickly transferred from the UPS system 115 to the utility supply 165. Then, the energy storage devices 105, e.g., batteries B, of the UPS system 115 are recharged from the utility supply 165 so that the UPS system 115 is ready for future interruptions or disturbances in the utility supply 165.

The step-up transformer 140 in the UPS system 115 meets the power requirements of the load 155; however, the step-up transformer 140 is a large and bulky component of the UPS system 115. As a result, the power density of the UPS system 115 is lower because the transformer 140 occupies a large amount of floor space, which, in some cities, can be quite expensive. The transformer 140 also introduces considerable losses (approximately 1 to 1.5% of the power) into the system thereby reducing the efficiency of the UPS system 115. Also, when traditional sinusoidal pulse width modulation (PWM) technique is used to operate the inverters and an ON-OFF PWM technique for bi-directional single stage DC-DC converters 110, current distortion increases. As a result, LC filters 130, which are expensive and bulky, are placed at the output of the two-level inverters 120 to reduce the current distortion or harmonics as demanded by the IT and/or mechanical load 155.

SUMMARY

The systems and methods of the present disclosure provide power to a load using a medium voltage uninterruptible power supply (UPS) without using an output transformer. The UPS includes a DC-DC converter and an inverter. The DC-DC converter may be a two-stage multi-level DC-DC converter that may be configured for unidirectional or bidirectional power flow. The DC-DC converter generates a high DC voltage from a low or medium voltage energy storage device such as a battery and/or ultra capacitor. The multi-level inverter converts the high DC voltage into a medium AC voltage (from about 3.3 kV to 35 kV, e.g., about 13.8 kV). The UPS may also include a small filter to remove any harmonics generated by the DC-DC converter and/or the multi-level inverter.

In one aspect, the present disclosure relates to a transformerless uninterruptible power supply (UPS) for an electrical load. The UPS includes an energy storage device, a two-stage DC-DC converter, and a multi-level inverter outputting a medium AC voltage. A negative terminal of the energy storage device, a negative terminal of the two-stage DC-DC converter, and a negative terminal of the multi-level inverter are electrically coupled to a common negative bus. The medium AC voltage may be between about 3.3 kV and about 35 kV.

The two-stage DC-DC converter may include a first stage that generates a first output DC voltage and a second stage that generates a second output DC voltage higher than the first output DC voltage. A positive terminal of the second stage of the DC-DC converter and a positive terminal of the multi-level inverter may be electrically coupled to a common positive bus. The first stage may include two levels and the second stage may include more than two levels. The second stage may include three levels or five levels.

The two-stage DC-DC converter may include a plurality of switches that form the levels of the first and second stages and a plurality of capacitors coupled together in a flying capacitor topology having a common negative bus. The medium AC output may be a three-phase AC output, the multi-level inverter may include three sets of switches, each of which corresponds to one of the three phases of the three-phase AC output, and each set of switches may be configured in a diode-clamped multi-level topology.

The multi-level inverter may convert the second output DC voltage into a third output voltage that is an AC voltage smaller than the second output DC voltage. The multi-level inverter may include more than two levels. The transformerless uninterruptible power supply may further include a filter electrically coupled to the AC output of the multi-level inverter to remove harmonics from the AC output of the multi-level inverter. The filter may be an inductor-capacitor-inductor filter.

The transformerless uninterruptible power supply may further include a DC-DC converter controller and a multi-level inverter controller. The DC-DC converter controller controls the first stage with pulse width modulation control signals and controls the second stage in flying mode configuration with fixed duty cycle control signals. The multi-level inverter controller controls the multi-level inverter using space vector PWM control signals so as to perform neutral point voltage balancing.

The two-stage DC-DC converter may be a bidirectional converter that allows the flow of power in a first direction from the energy storage device to the AC output of the multi-level inverter and in a second direction from the AC output of the multi-level inverter to the energy storage device. Alternatively, the two-stage DC-DC converter may be a unidirectional converter.

The energy storage device may be a low voltage energy storage device. The low voltage may be between about 700 V and about 1200 V. The energy storage device may be a battery, an ultra-capacitor, or a battery and an ultra-capacitor electrically coupled to one another.

In another aspect, the present disclosure features a transformerless uninterruptible power supply for an electrical load including an energy storage device, a single stage DC-DC converter, and a multi-level inverter having a medium AC voltage output. A negative terminal of the energy storage device, a negative terminal of the single stage DC-DC converter, and a negative terminal of the multi-level inverter are electrically coupled to a common negative bus.

The single stage DC-DC converter may include a plurality of switches that form the levels of the single stage DC-DC converter and a plurality of capacitors coupled together in a flying capacitor topology having a common negative bus.

The energy storage device may be a high voltage energy storage device. The high voltage may be between about 4 kV and about 7 kV. The energy storage device is a battery, an ultra-capacitor, or a battery and an ultra-capacitor electrically coupled to one another.

In yet another aspect, the present disclosure features a method for supplying power from a transformerless uninterruptible power supply to an electrical load when an interruption in power occurs. The method includes supplying a first DC voltage from an low voltage energy storage device to a DC-DC converter, converting the first DC voltage into a second DC voltage, providing the second DC voltage to a multi-level inverter, and generating an AC voltage from the second DC voltage. The AC voltage is a medium voltage less than the second DC voltage.

BRIEF DESCRIPTION OF THE DRAWINGS

Various embodiments of the present disclosure are described with reference to the accompanying drawings wherein.

DETAILED DESCRIPTION

Figure 1:
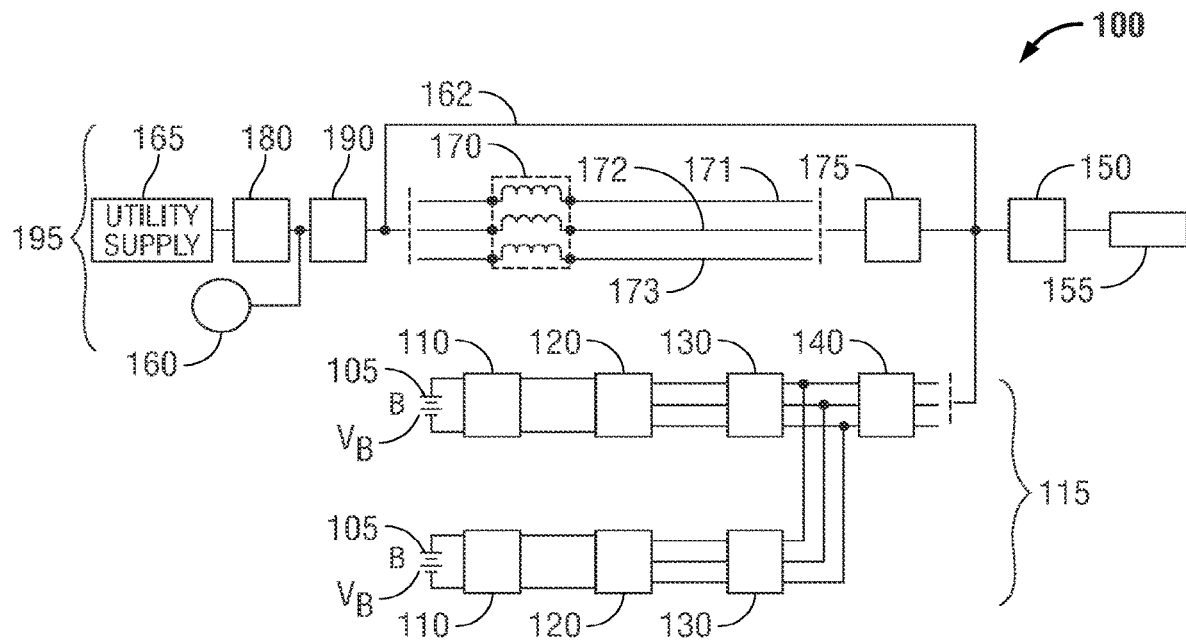
FIG. 1 is a schematic block diagram of a power supply system according to the prior art.

Embodiments of the present disclosure are described in detail with reference to the drawing figures wherein like reference numerals identify similar or identical elements.

The present disclosure relates to a multi-level, transformer-less, off-line energy storage UPS system that includes a multi-level DC-DC converter and a multi-level inverter coupled together. An on-line UPS is a double conversion UPS that it is connected in series with a power source. The efficiency of a conventional on-line UPS is about 93-96% because of the double-conversion losses (i.e., losses from the AC-DC converter and DC-AC inverter sections) and because of the series connection of the UPS with the power source. An off-line energy storage UPS in energy storage mode is connected in parallel with the power source. The efficiency of a conventional off-line UPS using an output transformer is about 97% to 98%. In contrast, the transformer-less, off-line energy storage multi-level UPS according to the present disclosure can achieve efficiencies of about 98.5% to 99%.

Figure 2:
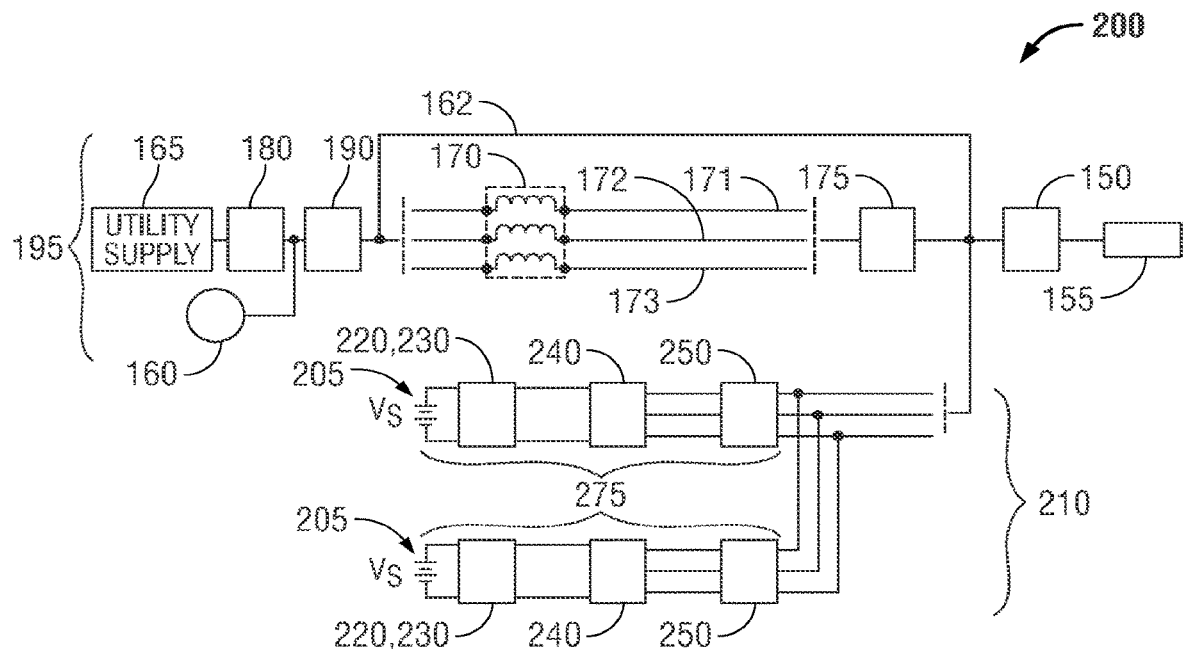
FIG. 2 is a schematic block diagram of a power supply system including a multi-level uninterruptible power supply (UPS) without any output transformer according to embodiments of the present disclosure.

FIG. 2 is a schematic diagram of a system 200 for supplying power to the load 155. The system 200 includes a transformer-less medium-voltage uninterruptible power supply (UPS) system 210 and a utility/generator power supply system 195. An energy storage device 205 supplies power to a DC-DC converter 220, as described in more detail below with respect to FIG. 3, or a DC-DC converter 230, as described in more detail below with respect to FIG. 4. The energy storage device 205, designated as Vs, may be, for example, one or more high density Li-ion batteries and/or one or more ultra-capacitors where the battery and the ultra-capacitor are in parallel electrical connection with one another. The energy storage device 205 may supply between about 500 V and about 2000 V, and preferably between about 700 V and about 1200 V.

The DC-DC converter 220 converts the DC voltage from the energy storage device 205 into a high DC voltage. The high DC voltage, designated V2 in FIGS. 3 and 4, may be between about 18 kV and about 30 kV. The high DC voltage V2 is converted into a medium AC voltage (e.g., about 13.8 kV) using a multi-level inverter 240. Medium voltage (MV) distribution is cost effective because it reduces copper conduction costs of the distribution cable. The medium AC voltage may then pass to the step-down transformer 150 of the data center to supply an appropriate IT load voltage. However, if there are harmonics in the medium AC voltage, then a small filter 250, for example, an inductor-capacitor-inductor (LCL) filter, may be used to remove the harmonics from the medium AC voltage before passing it to the step-down transformer 150, which converts the medium AC voltage to a low AC voltage, e.g., approximately 400 V AC.

Figure 3:
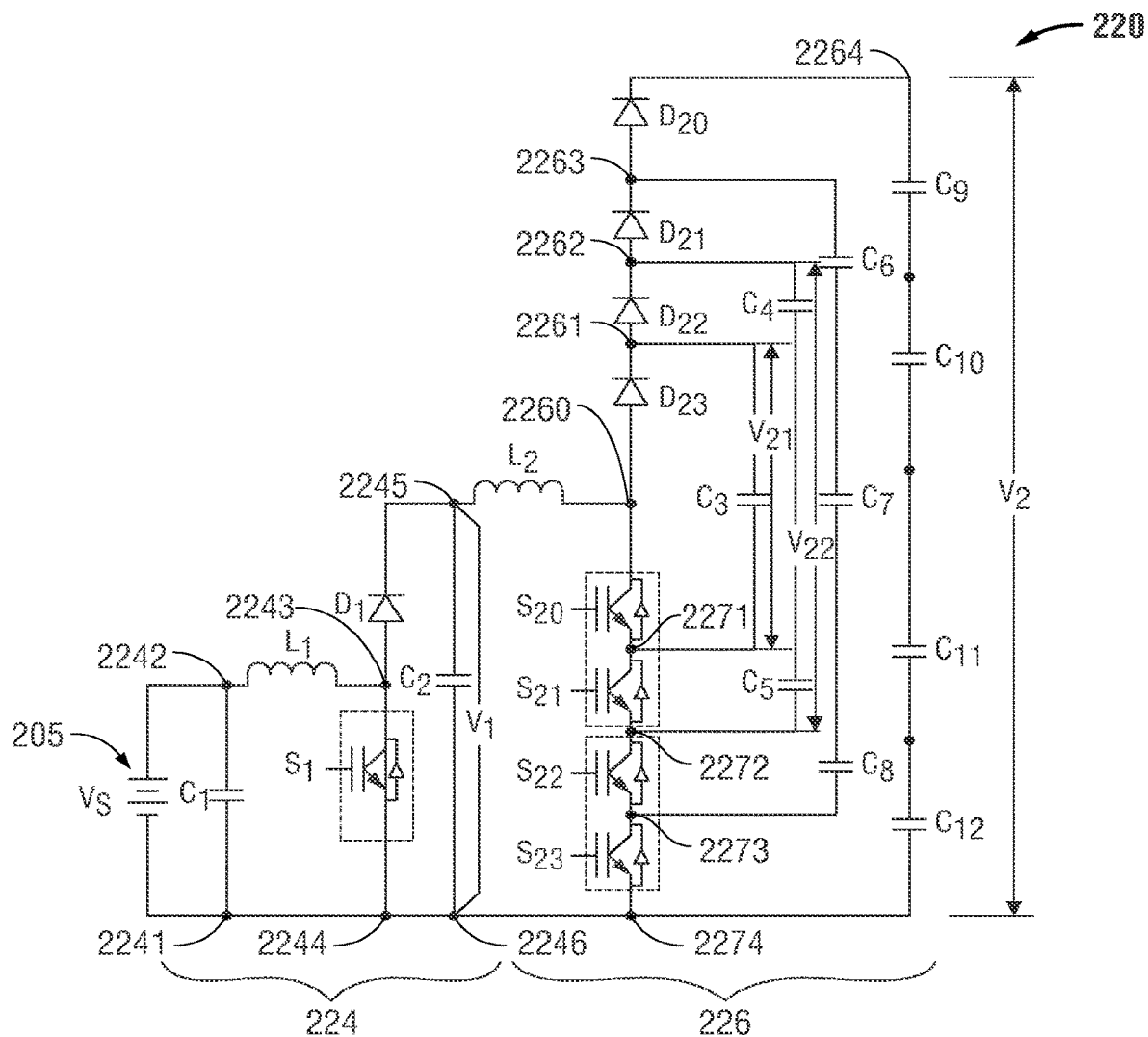
FIG. 3 is a circuit diagram of an embodiment of the multi-level two-stage unidirectional DC-DC converter section of the UPS of FIG. 2.

FIGS. 3-6 are circuit diagrams of different embodiments of DC-DC converters 220, 230, 232, and 234 that may be used with UPS system 210. FIG. 3 depicts DC-DC converter 220, described above with respect to FIG. 2, which is a unidirectional DC-DC converter with two stages 224 and 226. The first DC-DC stage 224 converts the voltage from the energy storage device 205 into voltage V1. Voltage V1 is a DC voltage higher than the voltage of the energy storage device 205. The second DC-DC stage 226 converts the voltage V1 into voltage V2, which is higher than voltage V1. The voltage boost from the first and second stages 224, 226 can range from about 1:5 to about 1:10. The voltage boost of the DC-DC converter 220 can be adjusted by changing the size of the switches at each level, the number of stages, and/or the number of levels in each stage. The optimum boost voltage requirement is based on the given voltage of the energy storage device 205 and the required voltage output from the inverter 240. For lower voltage outputs from the inverter 240 the boost voltage ratio can be lower. For higher voltage outputs from the inverter 240 the boost voltage ratio can be higher. The efficiency of the DC-DC converter 220 is reduced when the boost ratio is greater than about 7.

The first stage 224 of the DC-DC converter 220 is shown as a unidirectional, two-level DC-DC converter having one insulator gate bipolar transistor (IGBT) switch S1 connected in series with one diode D1. The switch S1 and the diode D1 are connected to the energy storage device 205 through an LC filter, which includes capacitor C1 and inductor L1. Capacitor C1 is connected in parallel across the terminals of energy storage device 205 from junction 2241 on the negative terminal to junction 2242 on the positive terminal. Inductor L1 is connected from the positive junction 2242 to the collector terminal of switch S1 at junction 2243.

The switch S1 is connected from the positive junction 2243 to junction 2244 on the negative terminal side of energy storage device 205 which is at an equipotential with junction 2241. Anode terminal of Diode D1 is connected from the positive junction 2243 to positive junction 245. Capacitor C2 is connected from positive junction 2245 to negative junction 2246 with is at an equipotential with junctions 2241 and 2244. Voltage V1 is the potential difference between junction 2245 and junction 2246 across capacitor C2. Thus, diode D1 and capacitor C2 are connected in series with respect to the energy storage device 205.

If the switch S1 is formed into a boost converter, the first stage 224 may provide a range of duty or boost ratios. For example, as shown in Table 1 below, the boost ratio may range from 0 to 0.9. Thus, if the input voltage (VS) to the first stage 224 is about 1 kV, the output voltage (V1) ranges from 1 kV to 10 kV depending on the value of the boost ratio, as shown in Table 1. The voltage V1 varies depending upon the inductance of L1 multiplied by the rate of current change di/dt. As used herein, voltage V1 refers to the voltage output of the first stage of a DC-DC converter. Also, as used herein, voltage V2 refers to the output voltage of the final stage of a DC-DC converter.

TABLE 1

| VS (~1 kV) | Duty (Boost) ratio | V 1 |
|---|---|---|
| 1 kV | 0 | 1 kV |
| 1 kV | 0.2 | 1.25 kV |
| 1 kV | 0.4 | 1.66 kV |
| 1 kV | 0.6 | 2.5 kV |
| 1 kV | 0.7 | 3.3 kV |
| 1 kV | 0.8 | 5 kV |
| 1 kV | 0.9 | 10 kV |

The IGBT in switch S1 may be configured in such a way as to handle a lower voltage and a higher current. Furthermore, because the IGBT of switch S1 is handling a lower voltage, the overall size of the IGBT may be smaller.

Output capacitor C2 and inductor L2 connect the first stage 224 to the second stage 226. More particularly, inductor L2 is connected from the positive junction 2245 to a positive junction 2260 which forms a common positive junction for the second stage 226.

Figure 4:
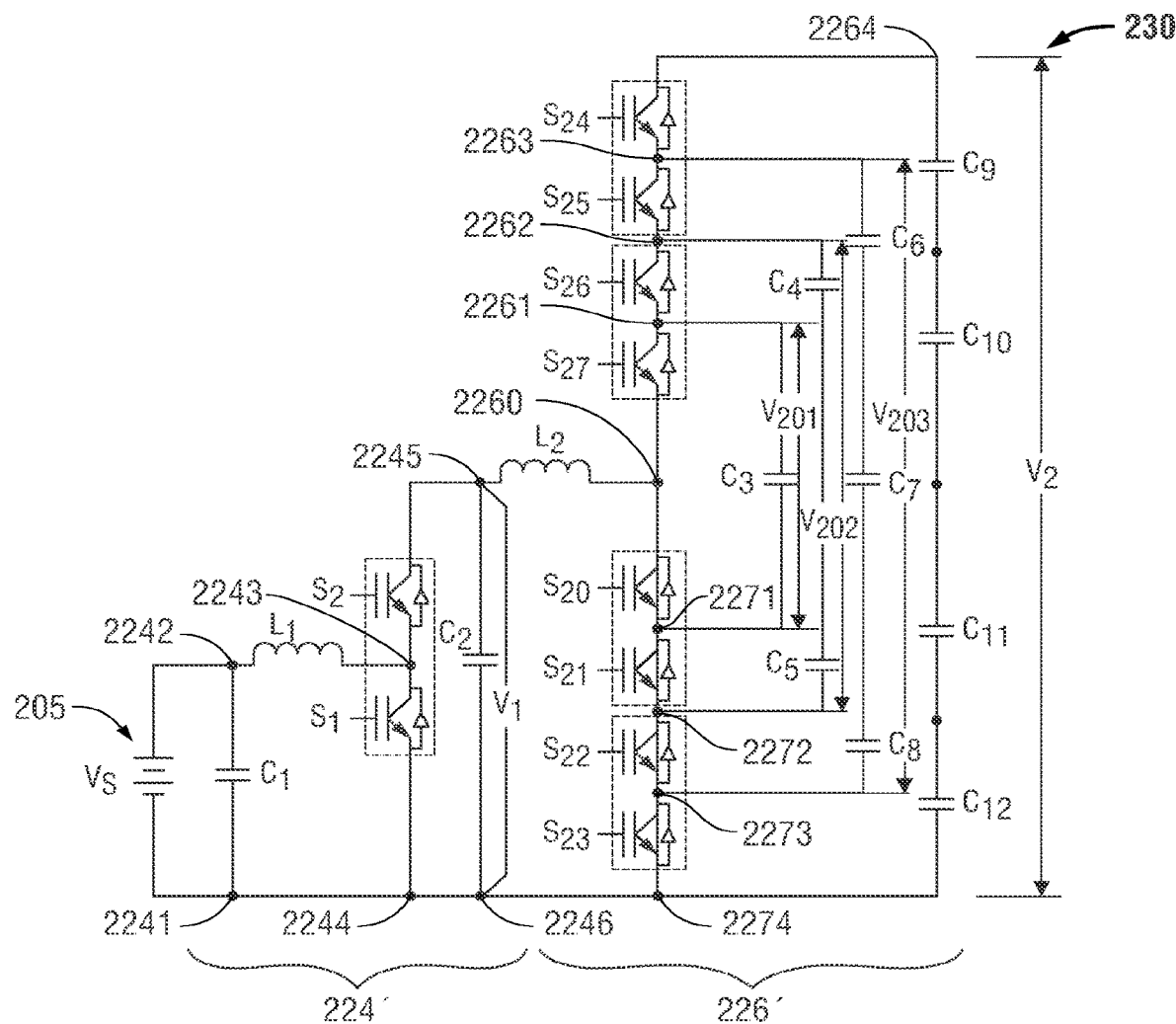
FIG. 4 is a circuit diagram of another embodiment of the multi-level two-stage bidirectional DC-DC converter section of the UPS of FIG. 2.
Figure 5:
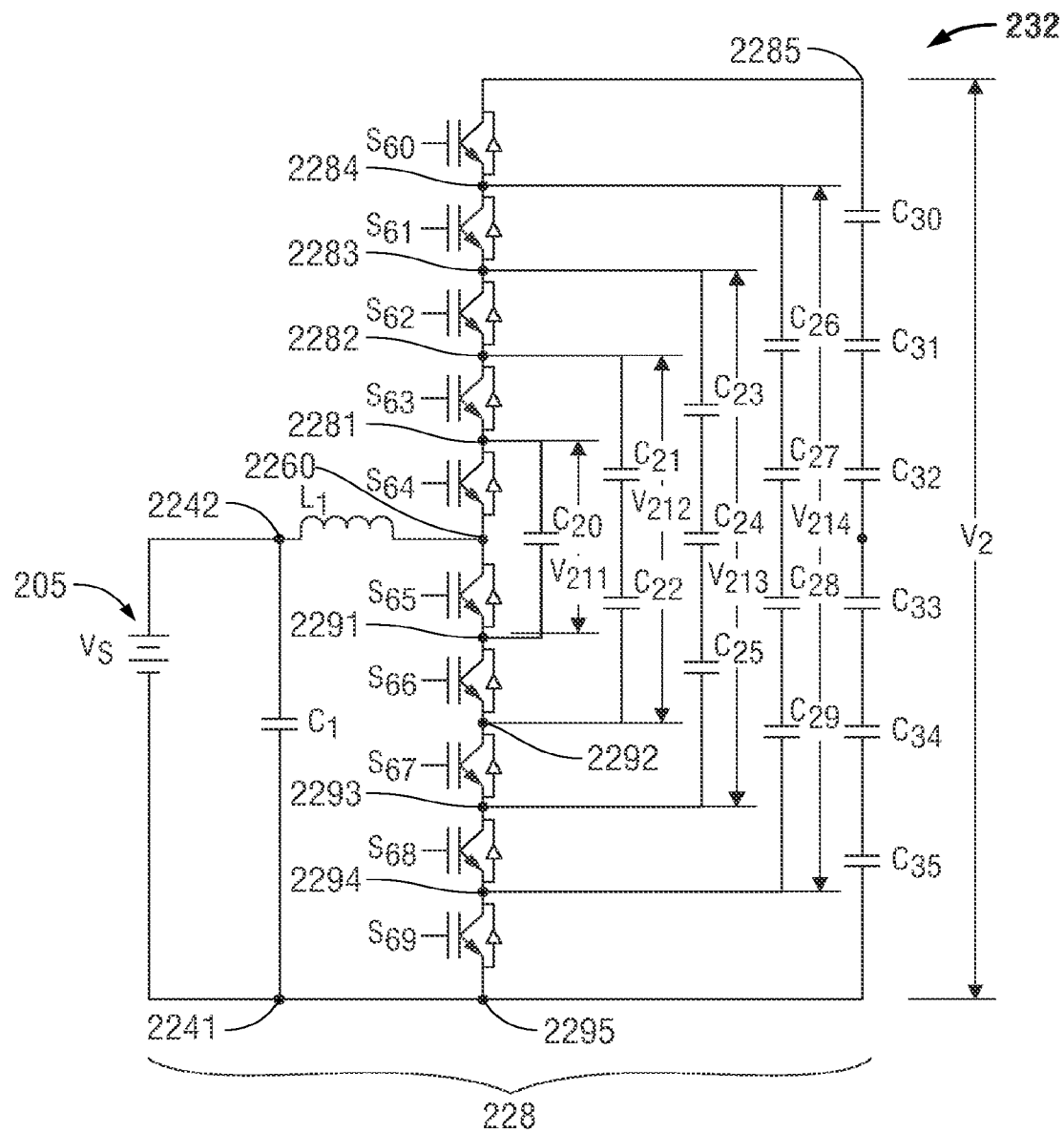
FIG. 5 is a circuit diagram of yet another embodiment of the multi-level single-stage bi-directional DC-DC converter section of the UPS of FIG. 2.
Figure 6:
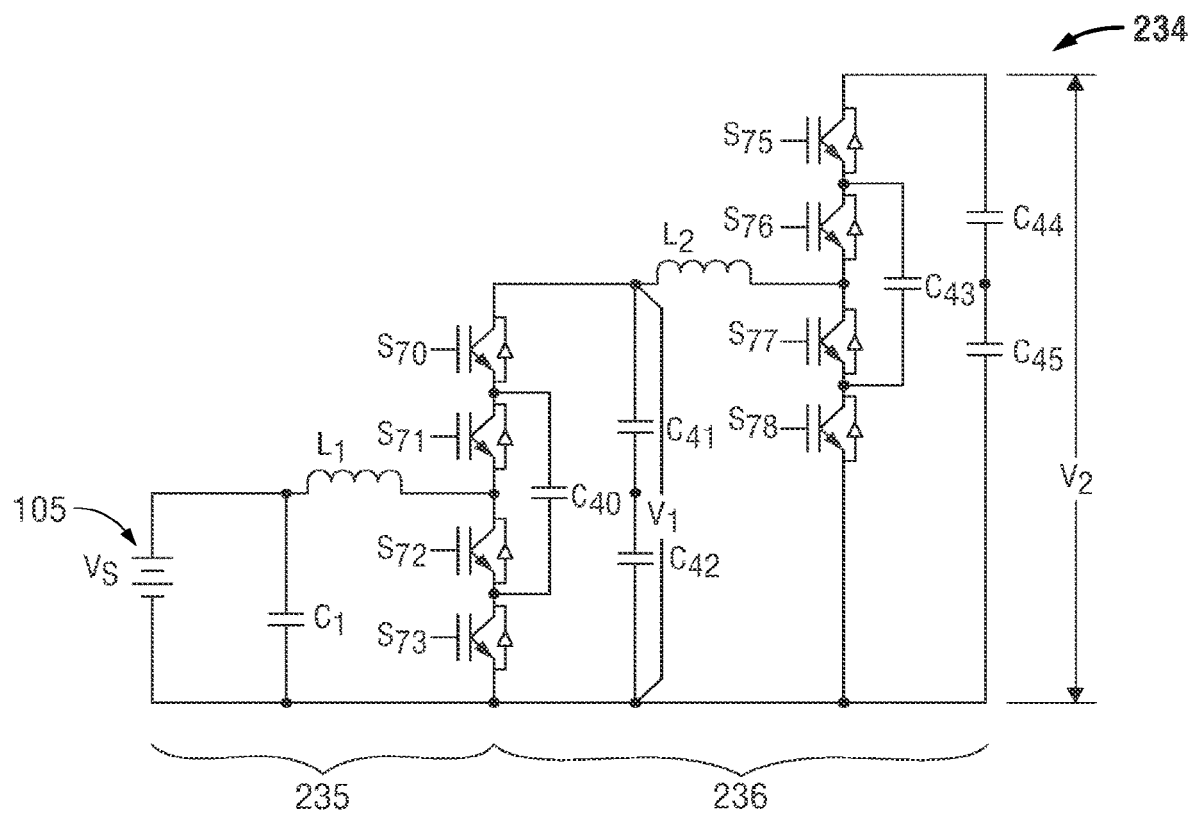
FIG. 6 is a circuit diagram of still another embodiment of the multi-level two-stage bidirectional DC-DC converter of the UPS of FIG. 2.

The second stage 226 depicts a five-level, unidirectional DC-DC converter; however, as illustrated in FIGS. 4-6, both the first and second stages 224, 226 may include different numbers of levels than are illustrated in FIG. 3. As shown in FIG. 3, four switches S20-S23 and four diodes D20-D23 are shown connected together with capacitors C3-C12 in a multi-level flying capacitor unidirectional arrangement. More particularly, diode D23 is connected from positive junction 2260 to positive junction 2261. Capacitor C3 is connected from positive junction 2261 to negative junction 2271 which is on the emitter side of switch S20. The collector side of switch S20 is connected from positive junction 2260. Voltage V21 is measured across capacitor C3 from positive junction 2261 to negative junction 2271.

Similarly, diode D22 is connected from positive junction 2261 to positive junction 2262. Capacitors C4 and C5 are connected in series from positive junction 2262 to negative junction 2272 at the emitter side of switch S21. The collector side of switch S21 is connected to negative junction 2271. Voltage V22 is measured across capacitors C4 and C5 from positive junction 2262 to negative junction 2272.

Likewise, diode D21 is connected from positive junction 2262 to positive junction 2263. Capacitors C6, C7, and C8 are connected in series from positive junction 2263 to negative junction 2273 at the emitter side of switch S22. The collector side of switch S22 is connected to negative junction 2272. Voltage V23 is measured across capacitors C6, C7, and C8 from positive junction 2263 to negative junction 2273.

In the final level, diode D20 and capacitors C9, C10, C11, and C12 are each connected in series from positive junction 2264 to negative junction 2274 on the emitter side of switch S23. The collector side of switch S23 is connected to negative junction 2273. The emitter side of S23 is connected to negative junction 2274, which is at an equipotential with negative junctions 2241, 2244, and 2246. Voltage V2 is measured across capacitors C9, C10, C11, and C12 from positive junction 2264 on the output (cathode) side of diode D20 to negative junction 2274 at the negative side of capacitor C12. Negative junction 2274 is at an equipotential with negative junctions 2246, 2244, and 2241.

Each switch S20-S23 in the second stage 226 is rated same as voltage of switch S1 in the first stage 224 but its rated current capacity is lower to handle smaller current in the second stage 226.

The capacitors C3-C12 are relatively small capacitors, e.g., capacitors rated for about 5 kV with a capacitance value that is about ten times less than a capacitor for a conventional DC-DC converter. For example, if a conventional two-level DC-DC converter needs a capacitor having a value of about 2000 µF, then the multi-level flying capacitor arrangement (i.e., C3-C12) needs a capacitor having a value of about 200 µF. In a five-level arrangement, each switch S20-S23 operates at a fixed duty cycle of 25% and a fixed switching frequency without pulse width modulation. The voltages V21, V22, V23, and V2 across the capacitors C3-C12 may be balanced in every switching cycle due to fixed duty cycle operation. Additionally, the voltage across each switch S20-S23 maintains 25% of the high voltage V2.

Referring to FIG. 3, the voltage V21 across C3 is equal to 1×V1 of C2; the voltage V22 across capacitors C4 and C5 is equal to 2×V1; the voltage V23 across capacitors C6-C8 is equal to 3×V1; and the voltage across C9-C12, which is voltage V2, is equal to 4×V1. The voltage across C2 is V1. Since the junction 2271 is at the same potential as junctions 2246 and 2274 due to switching on the switches S21, S22, and S23, and switching off the switch S20, the voltage V21 across C3 is equal to V1. As a result, the boost ratio of the second stage 226 is 1:4. If another extra switch such as S23, another extra diode such as D20 and five capacitors, i.e., one more capacitor in addition to the four capacitors C9 to C12, were added, then the output DC voltage V2 would be 5×V1 and the boost ratio would be 1:5, and so forth. Additionally, as switches are added to the second stage 226, the duty cycle is decreased accordingly. For example, five switches, i.e., six levels, in the second stage 226 would exhibit a duty cycle of 20%.

The use of the diodes D1 and D20-D23 allow for current to flow in one direction in the unidirectional DC-DC converter 220. Thus, an additional charger (not shown) is required to charge the energy storage device 205 when the generator 160 or the utility supply 165 is supplying power to the load 155.

FIG. 4 shows another embodiment of the DC-DC converter 220 of FIG. 2, which is a two-stage, bidirectional DC-DC converter 230. The two-stage bidirectional DC-DC converter 230 can be used to supply power from the energy storage device 205 to the load 155 when power from the generator 160 or utility supply 165 is interrupted or to charge the energy storage device 205 with power from the generator 160 or the utility supply 165 when the generator 160 or the utility supply 165 is supplying power to the load 155.

The two-stage bidirectional DC-DC converter 230 is a bi-directional version of the two-stage unidirectional DC-DC converter 220 of FIG. 3. Comparing FIG. 4 to FIG. 3, in first stage 224, diode D1 is now replaced in first stage 224' by switch S2 and in second stage 226, diodes D20, D21, D22, and D23 are now replaced in second stage 226' by switches S24, S25, S26, and S27, respectively. Switches S1 and S20-S23 are used to supply power to the load 155 and switches S2 and S24-S27 are used to charge the energy storage device 205. In particular, switch S1 is configured as a boost converter that converts the voltage Vs of the energy storage device 205 to a higher voltage and the switch S2 is configured as a buck converter that converts voltage from the generator 160 or utility supply 165 to a lower voltage appropriate for charging the energy storage device 205, e.g., a voltage slightly more than Vs.

Voltage V201 is measured across switches S20 and S27 and capacitor C3 from junction 2261 to junction 2271. Voltage V202 is measured across switches S21 and S26 and capacitors C4 and C5 from junction 2262 to junction 2272. Voltage V203 is measured across switches S22 and S25 and capacitors C6, C7, and C8 from junction 2263 to junction 2273. Voltage V2 is then measured across switches S23 and S24 and capacitors C9, C10, C11, and C12 from junction 2264 to junction 2274.

Each of the switches S20-S27 outputs a voltage equal to the input voltage V1. Thus, the capacitance of capacitor C9 equals the capacitance of capacitor C2, the capacitance of capacitor C10 equals the capacitance of capacitor C2, the capacitance of capacitor C11 equals the capacitance of capacitor C2, and the capacitance of capacitor C12 equals the capacitance of capacitor C2. Since the switches S20-S27 are connected in series, the output voltage V2 is equal to the sum of the voltages output from each of the switches S20-S27. Thus, the boost ratio is 4:1 and V2 equals 4×V1.

FIG. 5 shows yet another embodiment of the DC-DC converter 220 of FIG. 2, which is a one-stage 228, bidirectional DC-DC converter 232. The one-stage 228 of DC-DC converter 232 includes the energy storage device 205, capacitor C1, and inductor L1 configured in the same manner as first stage 224 in FIG. 4. However, as compared to FIG. 4, switches S1 and S2, capacitor C2 and inductor L2 are now omitted.

The bi-directional DC-DC converter 232 includes six levels, i.e., five switches S60-S64 on a top side and five switches S65-S69 on a bottom side, to convert the DC voltage Vs from the energy storage device 205 into the DC voltage V2. Since switches S1 and S2, capacitor C2, and inductor L2, i.e., the first stage, are omitted, there is no voltage V1.

Voltage V211 is measured across switches S64 and S65 and capacitor C20 from junction 2281 to junction 2291. Voltage V212 is measured across switches S63 and S66 and capacitors C21 and C22 from junction 2282 to junction 2292. Voltage V213 is measured across switches S62 and S67 and capacitors C23, C24, and C25 from junction 2283 to junction 2293. Voltage V214 is measured across switches S61 and S68 and capacitors C26, C27, C28, and C29 from junction 2284 to junction 2294. Voltage V2 is then measured across switches S60 and S69 and capacitors C30, C31, C32, 33, and C34 from junction 2285 to junction 2295. Thus, the DC voltage Vs is converted directly into the DC voltage V2 without an intermediate voltage V1.

For a conventional one-stage DC-DC converter, the boost ratio is about 1:18 to about 1:24 for lower energy storage voltages, e.g., 1 kV. The efficiency of a DC-DC converter is reduced when the high boost conversion ratio is greater than about 7. Whereas for the two-stage DC-DC converter 220, 230, or 234, the boost ratio of each stage is about 1:4 to about 1:6. In the case of the DC-DC converter 232 of FIG. 5, the voltage of the energy storage device is high (e.g., about 4 kV to about 6 kV), which reduces the boost conversion ratio to around 5 to 7. This improves the efficiency of the DC-DC converter 232.

FIG. 6 shows yet another embodiment of the DC-DC converter 220 of FIG. 2 or bi-directional DC-DC converter 230 of FIG. 4. This embodiment is a two-stage bidirectional DC-DC converter 234. The first stage 235 of DC-DC converter 234 includes three levels and the second stage also includes three levels. The voltage V1 is greater than the voltage of the energy storage device 205 and the voltage V2 is greater than the voltage V1. The first stage 235 includes capacitors C40-C42 in a flying capacitor configuration. Likewise, the second stage 236 includes capacitors C43-C45 in a flying capacitor configuration.

The first stage 235 uses three levels with each switch S70-S73 operating at a fixed duty cycle of 50%. Switches S70-S73 are arranged in a buck-boost configuration. Thus, the switches S70-S73 supply an output voltage that is greater (when supplying power to the load 155) or less (when charging the energy storage device 205) than the input voltage. In other words, the switches S70-S73 step up the voltage supplied by the energy storage device 205 to the load 155, and step down the voltage provided by the generator 160 or the utility supply 165 to the energy storage device 205 to charge the energy storage device 205. If the voltage of the energy storage device 205 is about 5 kV and the boost ratio is about 1:2 (at 50% duty ratio), then the output voltage V1 is about 10 kV.

Alternatively, each of the switches S70-S73 may be standard converters, which are operated to output the same voltage that is input to the switches S70-S73. However, the battery voltages would need to be, for example, about 5 kV to obtain the desired voltage of 10 kV in a single stage. Therefore, both a high-voltage energy storage device (e.g., a 5 kV battery string) and a high-voltage IGBT switching device are needed for charging the energy storage device 205 to obtain a boost ratio of about 1:2 in a single stage and a boost ratio of about 1:4 in a two-stage configuration.

In other embodiments, if the first stage includes five switches (i.e., six levels) on the upper half, each of which output the same voltage as the input voltage, then the five switches would provide a boost ratio of about 1:5. If the second stage includes four switches (i.e., five levels) on the upper half, each of which output the same voltage as the input voltage, then the four switches would provide a boost ratio of about 1:4. Thus, the combination of the first and second stages would provide an overall boost ratio of about 1:20.

The second stage 236 of FIG. 6 also uses three levels with each switch S75-S78 operating at a fixed duty cycle of 50%. Each of switches S75-S78 is a standard converter that outputs a voltage that is the same as the input voltage. For two switches the boost ratio is about 1:2, which results in an overall boost ratio of about 1:4 in a two-stage configuration.

FIGS. 3-6 show one- or two-stage DC-DC converters. Other embodiments may include more than two stages.

As shown in FIGS. 4-6, the number of capacitors coupled in series between the collectors of switches arranged in the upper portion of a stage and the emitters of the switches arranged in the lower portion of the stage depends on the level of the switch to which the capacitors are coupled. For example, capacitors C9-C12 (FIG. 4) mirror the capacitors of C30-C35 (FIG. 5), all of which are coupled in series between the collector of switch S60 and the emitter of switch S69. The DC-DC converters 220, 230, 232, or 234, however, may include any number of capacitors coupled in series between the collectors and emitters of appropriate switches to achieve a desired result. The DC-DC converter 220 of FIG. 3 and the DC-DC converter 230 of FIG. 4 are five-level converters in flying capacitor configuration.

Figure 7:
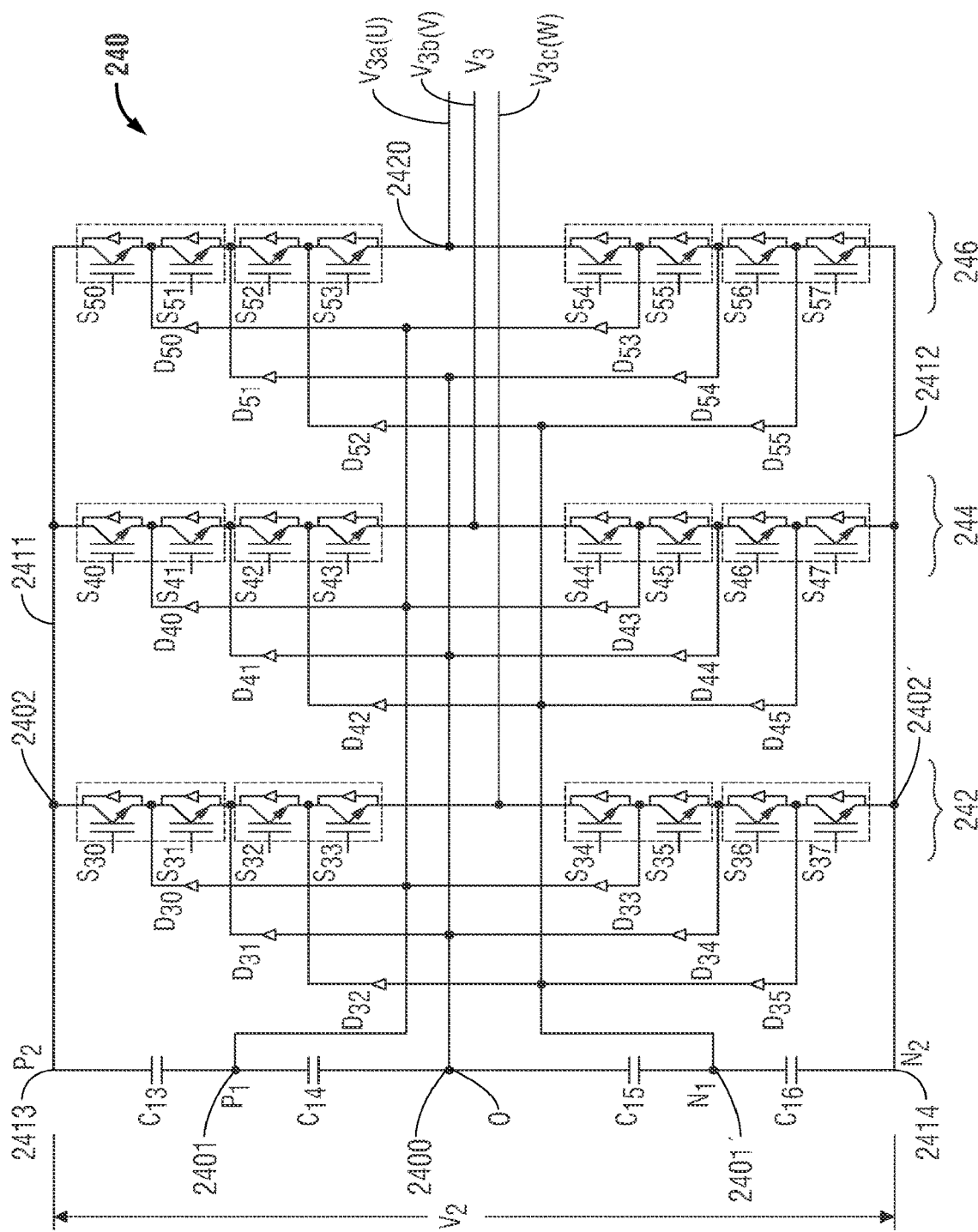
FIG. 7 is a circuit diagram of an embodiment of a five-level diode-clamped inverter of the UPS of FIG. 2.
Figure 10:
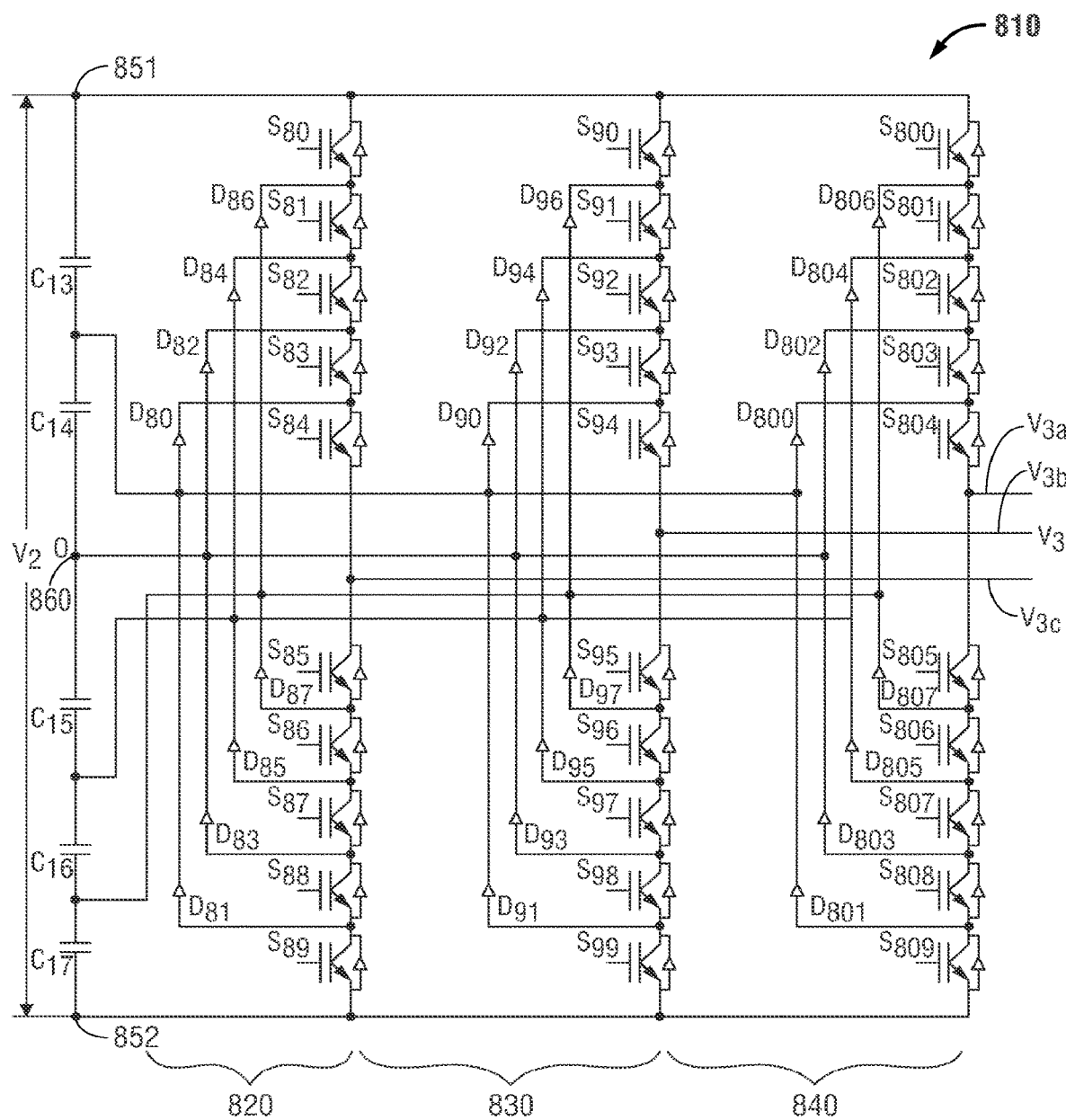
FIG. 10 is a circuit diagram of another embodiment of a six-level diode-clamped inverter of the UPS of FIG. 2.

FIGS. 7 and 10 show inverters 240 or 810, respectively, which may be used to convert the DC voltage output V2 from the converters 220, 230, 232, or 234 to 3-phase AC voltage V3. FIG. 7 shows a five-level diode-clamped inverter 240. The five-level inverter 240 includes three groupings of switches and diodes 242, 244, and 246 to generate the three phases V3a, V3b, and V3c of the AC voltage V3, which is the output voltage of the inverter 240. Each grouping of diodes D30-D35, D40-D45, and D50-D55 and corresponding switches S30-S37, S40-S47, and S50-S57 are connected together in a diode-clamped configuration.

Switches S30-S37, S40-S47, and S50-S57 may be IGBTs. IGBTs allow for higher currents and higher switching frequencies. The five-level inverter 240 illustrated in FIG. 7 allows for sharing of the high voltage among the switches S30-S37, S40-S47, and S50-S57 and reduces harmonic distortion. In some embodiments, the harmonics of voltage V3 may be so low (e.g., less than about 5 percent) that a filter (e.g., filter 130) may not be needed on the voltage V3 output line. Referring to FIG. 2, in embodiments, the inverter 240 of FIG. 2 may be a four-level or higher inverter.

The switches S30-S37, S40-S47, and S50-S57 are controlled by a microprocessor (not shown) such as a digital signal processor (DSP) (not shown). The DSP may use a space vector pulse width modulation (SVPWM) technique for operating the switches S30-S37, S40-S47, and S50-S57 in such a way that the neutral-point voltage remains balanced in open-loop operation. The SVPWM technique is an inverter modulation technique for synthesizing a voltage space vector V* (described below with respect to FIG. 8) over a modulation sampling period $T_s$ (see FIG. 9 discussed below).

The SVPWM technique provides the advantages of superior harmonic quality and large under-modulation range that extends the modulation factor from 78.5% to 90.7%. Alternatively or in addition to the SVPWM, an artificial neural network (ANN) can be used to reduce harmonics outputted from the inverter 240 or 810 and can eliminate the need for the filter 250 (see FIG. 2) on the output lines having voltage V3 (see FIGS. 7 and 10).

Space vector pulse width modulation of three-level inverters with respect to neural networks is described in "A Neural-Network-Based Space-Vector PWM Controller for a Three-Level Voltage-Fed Inverter Induction Motor Drive", by Subrata K. Mondal, Joao O. P. Pinto and Bimal K. Bose, published in IEEE Transactions on Industry Applications, Vol. 38, No. 3, May/June 2002, Paper IPCSD 02-005, presented at the 2001 Industry Applications Society Annual Meeting, Chicago, Ill., September 30-October 5, 0093-9994 ©2002 IEEE, and in "Neural-Network-Based Space-Vector PWM of a Three-Level Inverter Covering Overmodulation Region and Performance Evaluation in Induction Motor Drive", by Cong Wang, Bimal K. Bose, Valentin Oleschuk, Subrata Mondal, and Joao O. Pinto, 0-7803-7906-3/03 ©2003 IEEE, the entire contents of both of which are hereby incorporated by reference herein.

Additionally, space vector pulse width modulation of three-level inverters is described in "Space Vector Pulse Width Modulation of Three-Level Inverter Extending Operation Into Overmodulation Region," by Subrata K. Mondal, Bimal K. Bose, Valentin Oleschuk and Joao O. P. Pinto, published in IEEE Transactions on Power Electronics, Vol. 18, No. 2, March 2003, 0885-8993 ©2003 IEEE, the entire contents of which is hereby incorporated by reference herein.

Figure 8:
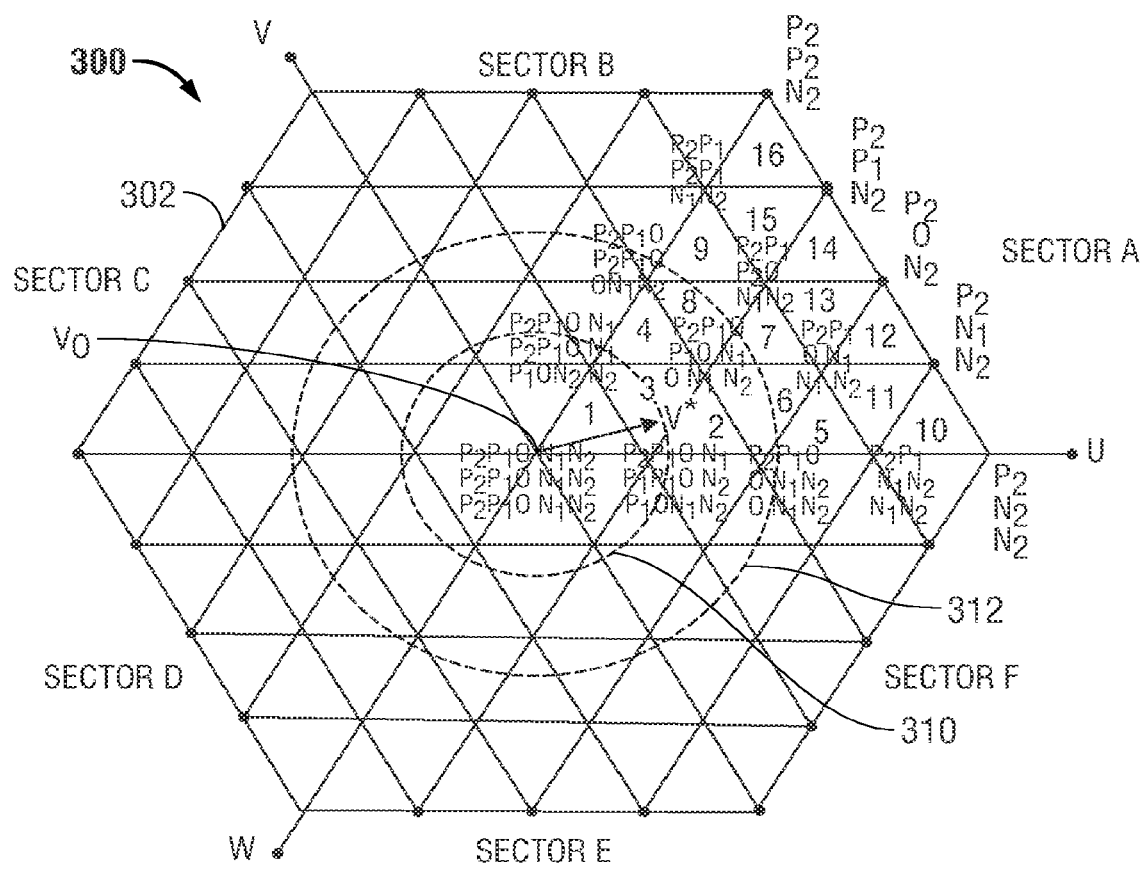
FIG. 8 is a space-vector modulation diagram showing switching states for Sector A of the 5-level inverter of FIG. 7.

FIG. 8 is a space-vector modulation diagram 300 showing switching states for Sector A of the 5-level inverter 240 of FIG. 7 according to embodiments of the present disclosure.

Figure 9:
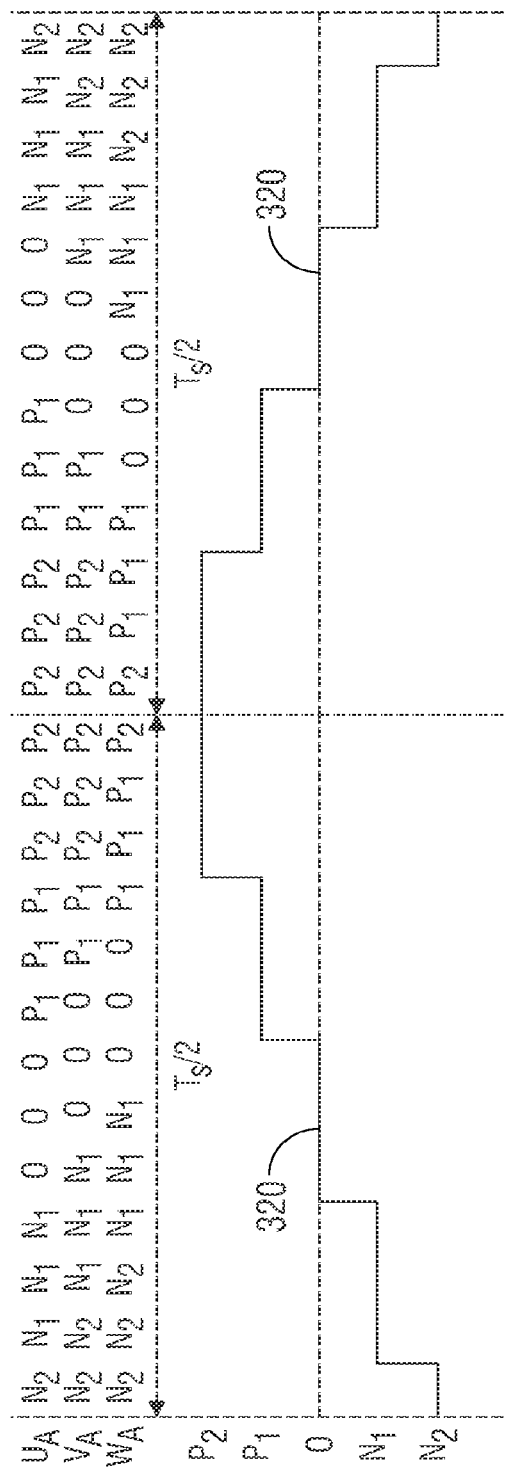
FIG. 9 shows the sequence of switching states and waveform of phase U for region 1 in Sector A ($U_{A1}$) of the space-vector modulation diagram of FIG. 8.

FIG. 9 shows the sequence of switching states of phase U for region 1 in Sector A ($U_{A1}$) of the space-vector modulation diagram 300 in FIG. 8. The switching states for the space-vector modulation diagram 300 are such that the sequence of switching causes balancing of the voltages across the capacitors C13, C14, C15 and C16 of the 5-level inverter 240 of FIG. 7 in open loop operation.

Referring to FIGS. 8 and 9, space-vector modulation diagram 300 is formed by a hexagon 302. The hexagon 302 for the 5-level design has six sectors, i.e., sectors A, B, C, D, E, and F, each of which has sixteen regions (1-16), giving altogether 96 regions of operations, i.e., 16 regions×6 sectors=96 regions of operations.

There are 125 switching states in 5-level inverters such as the 5-level diode-clamped inverter 240 of FIG. 7. There are 120 active states and the remaining five states are zero states occurring at the center point $V_0$ of the diagram 300. U, V, and W (designated as V3a, V3b, and V3c, respectively in FIG. 7) are the phases and $P_2$, $P_1$, O, $N_1$, and $N_2$ are DC-bus points. The number of switching states is determined by raising the number of levels, e.g., 5, to the power of the number of phases, e.g., 3 for phases U, V, and W. Therefore, the number of switching states is 125 ($5^3$). Since there are six sectors, i.e., Sectors A, B, C, D, E, and F, with 20 active states per sector, the total number of active states is 120 (6×20). The active states are those states extending beyond the center point $V_0$.

As described above, the SVPWM technique is an inverter modulation technique for synthesizing a voltage space vector V*. In FIG. 8, voltage space vector V* originates at the center point $V_0$. In the example shown, the voltage space vector V* is characterized by a constant voltage value represented by a first circle 310 so that the voltage space vector V* may rotate around the center point $V_0$. Therefore, all switching states at the circumference of the first circle 310 are at the same voltage V*. Similarly, if the voltage space vector V* is characterized by a constant voltage value represented by a second circle 312 that is concentric with first circle 310, the voltage space vector V* then assumes a constant voltage represented by the second circle 312.

In the example shown, since the second circle 312 has a radius that is greater than the radius of the first circle 310, the constant voltage represented by the second circle 312 is greater than the constant voltage represented by the first circle 310. Alternatively, if the second circle 312 were to have a radius that is less than the radius of the first circle 310, then the constant voltage represented by the second circle 312 would be less than the constant voltage represented by the first circle 310.

Table 2 below illustrates the switching states for switches SX0-SX7 of the inverter 240, where X is 3, 4, or 5. Operation of each set of switches SX0-SX7 of FIG. 7 produces a phase of the three-phase AC output. In Table 2, the closing of a switch is represented by the numeral "1" and the opening of a switch is represented by the numeral "0."

TABLE 2

| Switching State | SX0 | SX1 | SX2 | SX3 | SX4 | SX5 | SX6 | SX7 |
|---|---|---|---|---|---|---|---|---|
| P2 | 1 | 1 | 1 | 1 | 0 | 0 | 0 | 0 |
| P1 | 0 | 1 | 1 | 1 | 1 | 0 | 0 | 0 |
| O | 0 | 0 | 1 | 1 | 1 | 1 | 0 | 0 |
| N1 | 0 | 0 | 0 | 1 | 1 | 1 | 1 | 0 |
| N2 | 0 | 0 | 0 | 0 | 1 | 1 | 1 | 1 |

(where X = 3, 4, or 5)

In FIG. 7, junction 2400 represents state O, so that state represents neutral point balancing so that the average current injected at O should be zero. Voltage V2 is measured at junction 2400 located between capacitors C14 and C15. States P1 and P2 represent positive bus voltage. States N1 and N2 represent negative bus voltages.

State P1 is represented by a voltage at junction 2401 between capacitors C14 and C13. State P2 corresponds to a voltage at junction 2413 on common positive bus 2411 that electrically couples junction 2400, capacitor C14, junction 2401, and capacitor C13 to junction 2420 for phase V3a or U. Switches S30, S31, S32, and S33 are electrically coupled to common positive bus 2411 at junction 2402 via the collector side of switch S30. Similarly, state N1 corresponds to a voltage at junction 2401' between capacitors C15 and C16. State N2 corresponds to a voltage at junction 2414 on common negative bus 2412 that electrically couples junction 2400, capacitor C15, junction 2401' and capacitor C16 to junction 2420 for phase V3a or U. Switches S34, S35, S36, and S37 are electrically coupled to common negative bus 2412 at junction 2402' via the emitter side of switch S37.

Referring again to Table 2, in conjunction with FIG. 7, phase W (V3c in FIG. 7), for example, is in state P2 (positive bus voltage) when the switches S30, S31, S32, and S33 are closed or ON and switches S34, S35, 36, and S37 are open or OFF The phase W is in state P1 (positive bus voltage that is less than P2) when switches S30, S35, S36, and S37 are open or OFF and switches S31, S32, 33, and S34 are closed or ON. The phase W is in state O when switches S30, S31, S36, and S37 are open or OFF and switches S32, S33, S34, and S35 are closed or ON.

The phase W is in state N1, which corresponds to a negative bus voltage that is greater than a negative bus voltage that corresponds to state N2, when switches S30, S31, S32, and S37 are turned off (i.e., open) and switches S33, 34, S35, and S36 are turned on (i.e., closed). The phase W is in state N2, which corresponds to a negative bus voltage that is less than the negative bus voltage that corresponds to state N1, when switches S30, S31, S32, and S33 are turned off (i.e., open) and switches S34, S35, S36, and S37 are turned on (i.e., closed).

In FIG. 9, the states P2, P1, O, N1, and N2, and waveform 32l are plotted versus a sampling period Ts or symmetrically over half a sampling period Ts/2 for the phase $U_A$ in Sector A. The top portion of FIG. 9 also shows the switching states P2, P1, O, N1, and N2 of all three phases UA, VA, and WA. The modulation strategy illustrated in FIGS. 7, 8, and 9 is a DSP-based SVPWM modulation strategy for a 5-level UPS system, e.g., the 5-level inverter 240 of FIG. 7.

It should be noted that in addition to the space-vector pulse width modulation method, those skilled in the art will recognize and understand that, as described in the publications referenced above, artificial neural networks may be applied for modulation of the switching states of the 5-level inverter 240 of FIG. 7.

FIG. 10 shows a six-level inverter 810. Similar to FIG. 7, the switches and diodes are connected into three groups 820, 830, 840, with each group providing one phase of the AC voltage V3. The six-level inverter 810 includes five capacitors C13-C17. The diodes D80-D87, D90-D97, and D800-D807, and the switches S80-S89, S90-S99, and S800-S809 are connected in a diode-clamped configuration. However, other configurations may be used. The neutral state O is measured at the junction between capacitors C14 and C15. Voltage V2 is measured from junction 851 on the collector side of switches S80-S89, S90-S99, and S800-S809 to junction 852 on the emitter side of switches S80-S89, S90-S99. The locations of the P and N states in the six-level inverter 810 differ from the locations of P2, P1, N1 and N2 described above with respect to five level inverter 240 in FIG. 7 and are not described or shown herein.

Figure 11:
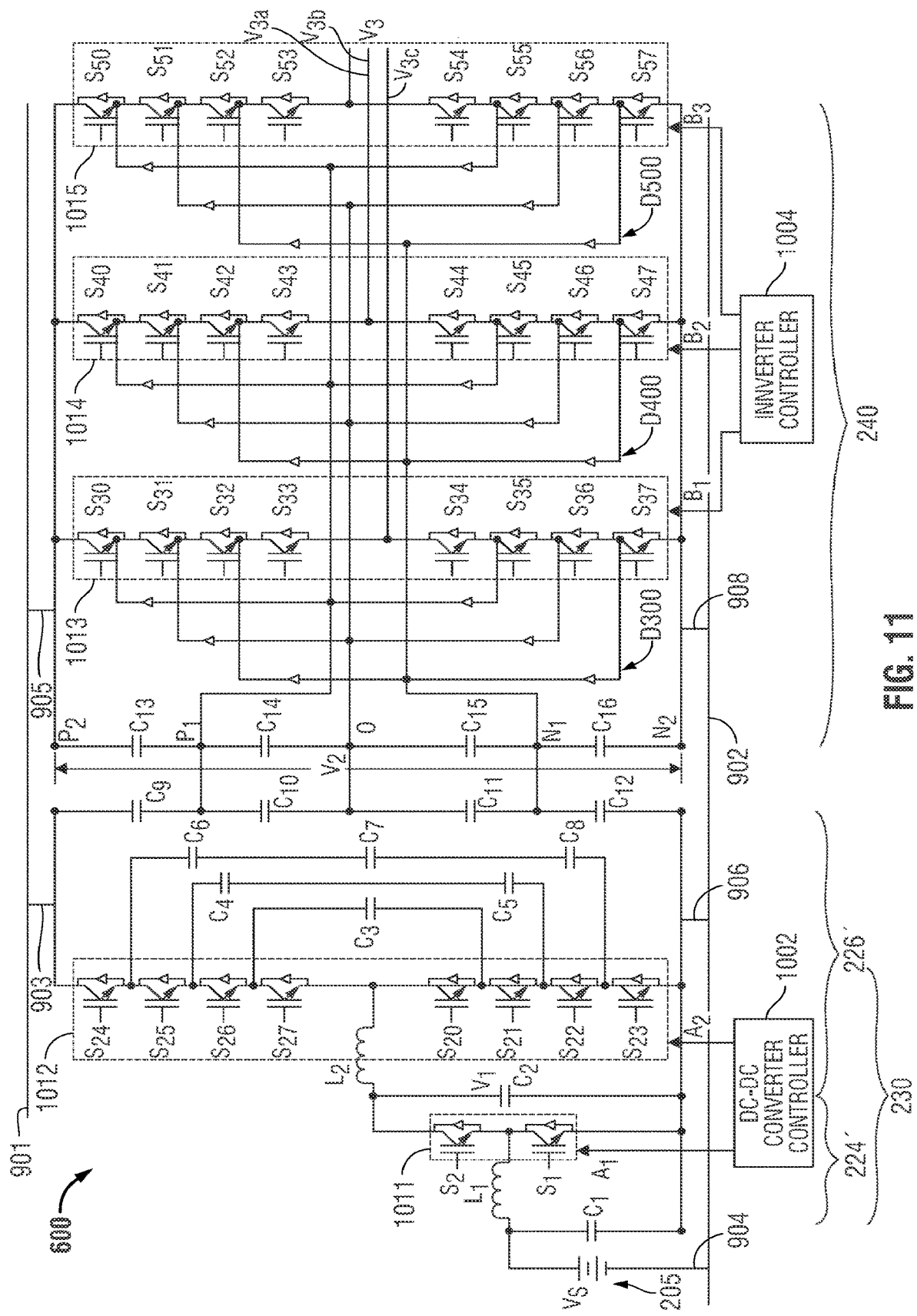
FIG. 11 is a circuit diagram of the multi-level two-stage bidirectional DC-DC converter of FIG. 4 coupled to the five-level diode-clamped inverter of FIG. 7.

FIG. 11 shows the integration of the DC-DC converter 230 of FIG. 4 and the inverter 240 of FIG. 7 into a transformerless medium voltage multi-level uninterruptible power supply (PS) system 600 for the electrical load 155 in FIG. 2. The transformerless medium voltage multi-level uninterruptible power supply (PS) system 600 is electrically coupled to a common DC power positive bus 901 via terminals 903 and 905 and to a common DC power negative bus 902 via terminals 904, 906 and 908. The capacitors 9-C12 may be the same as capacitors C13-C16, respectively. In embodiments, any one of the converters 220, 230, 232, or 234 of FIGS. 3-6, respectively, may be combined with either one of the inverters 240 or 810 of FIGS. 7 and 10, respectively. In further embodiments, the converter/inverter combination may include a converter with one or more stages and one or more levels per stage. The converter/inverter combination may also include an inverter with one or more levels, e.g., three levels with two switches in each phase grouping. Additionally, the converter/inverter combination may include a filter 250 (see FIG. 2) coupled to each output line that supplies voltage V3.

Referring also to FIG. 2, the transformerless uninterruptible power supply system 600 includes energy storage device 205 that provides DC output voltage Vs, two-stage DC-DC converter 230 having DC output voltage V2 and multi-level inverter 240 having medium AC voltage output V3, wherein negative terminal 904 of the energy storage device 205, negative terminal 906 of the two-stage DC-DC converter 230, and negative terminal 908 of the multi-level inverter 240 are electrically coupled to a common negative bus/common negative potential 902. The two-stage DC-DC converter 230 includes first stage 224' that generates first output DC voltage V1 and second stage 226' that generates second output DC voltage V2 that is higher than the first output DC voltage V1.

Positive terminal 903 of the second stage 226' of the DC-DC converter 230 and positive terminal 905 of the multi-level inverter 240 are electrically coupled to a common positive bus 901.

The first stage 224' includes two levels, e.g., switches S1 and S2, and the second stage 226' includes more than two levels, e.g., switches S20-S27 which represent a five-level flying capacitor configuration. In other embodiments, the second stage 226' includes three levels (not shown).

The two-stage DC-DC converter 230 includes the plurality of switches S1, S2, and S20-S27 (which are divided into a first set 1011 and a second set 1012), which form the levels of the first stage 224' and the second stage 226', and a plurality of capacitors C3, C4, C5, C6, C7 and C8 coupled together in a flying capacitor topology. The plurality of switches S1, S2, and S20-S27, and the flying capacitor topology are electrically coupled to a common negative bus 902.

The multi-level inverter 240 converts the second output DC voltage V2 into the third output voltage V3 that is an AC voltage smaller than the second output DC voltage V2.

In one embodiment, a transformerless uninterruptible power supply 275, that includes the components identified above with respect to transformerless uninterruptible power supply 600, includes filter 250 that is electrically coupled to the AC output of the multi-level inverter 240 and is configured to remove harmonics from the AC output of the multi-level inverter 240 occurring in voltage V3. The filter 250 may be an inductor-capacitor-inductor filter.

As described above with respect to FIG. 4, the two-stage DC-DC converter 230 is a bidirectional converter that is configured to allow the flow of power in a first direction from the energy storage device 205 to the AC output of the multi-level inverter 240 and in a second direction from the AC output of the multi-level inverter 240 to the energy storage device 205.

The energy storage device 205 may be a low voltage energy storage device wherein the low voltage is between about 700 V and about 1200 V. The energy storage device 205 may be a battery, an ultra-capacitor, or a battery and an ultra-capacitor electrically coupled to one another.

In one embodiment, the transformerless uninterruptible power supply 600 may be configured with the unidirectional two-stage DC-DC converter 220 described above with respect to FIG. 3.

As illustrated in FIG. 11, the multi-level inverter 240 includes more than two levels.

As illustrated in FIGS. 7 and 11, and as described above with respect to FIG. 7, the AC output is a three-phase AC output that includes phase V3a (or U), phase V3b (or V) and phase V3c (or W). The multi-level inverter includes three sets of switches, e.g., set 1013 that includes switches S30-S37 that are clamped to set D300 of diodes D30-D37, set 1014 that includes switches S40-S47 that are clamped to set D400 of diodes D40-D47 and set 1015 that includes switches S50-S57 that are clamped to set D500 of diodes D50-D57. Each set of switches and diodes corresponds one of the three phases of the three-phase AC output, and each set of switches is configured in a diode-clamped multi-level topology. More particularly, set 1013 corresponds to phase V3c (or W), set 1014 corresponds to phase V3b (or V) and set 1015 corresponds to phase V3a (or U).

In another aspect of the present disclosure, the transformerless uninterruptible power supply 600 may be configured instead with the single stage DC-DC converter 232 of FIG. 5 (not shown). In this case, the energy storage device 205 and the multi-level inverter 240, again having medium AC voltage output V3, are included, wherein the negative terminal 904 of the energy storage device 205, the negative terminal 906 of the single stage DC-DC converter 220, and the negative terminal 908 of the multi-level inverter 240 are again electrically coupled to a common negative bus/common negative potential 902.

The single stage DC-DC converter 232 also includes the set of switches S60-S69 that form the levels of the single stage DC-DC converter 232 and the plurality of capacitors C20-C35 coupled together in a flying capacitor topology electrically coupled to the common negative bus 902.

However, in this case, the energy storage device 205 is a high voltage energy storage device wherein the high voltage is between about 4 kV and about 7 kV. Again, the energy storage device 205 may be a battery, an ultra-capacitor, or a battery and an ultra-capacitor electrically coupled to one another.

The transformerless uninterruptible power supply 600 may further include a DC-DC converter controller 1002 that is configured to control the first stage 224' with pulse width modulation control signals A1 to switch set 1011 and configured to control the second stage 226' with fixed duty cycle control signals A2 to switch set 1012.

The transformerless uninterruptible power supply 600 may further include a multi-level inverter controller 1004 that is configured to control the multi-level inverter 240 using space vector PWM control signals B1 to switch set 1013 and diode set D300, control signals B2 to switch set 1014 and diode set D400, and control signals B3 to switch set 1015 and diode set D500 so as to perform neutral point voltage balancing.

Figure 12:
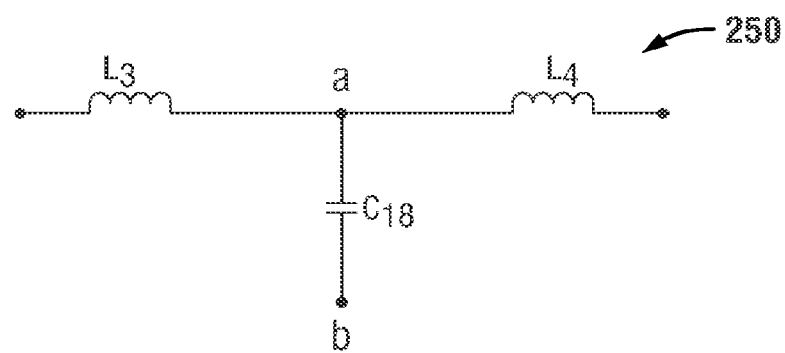
FIG. 12 is a schematic diagram of an embodiment of a filter of the UPS of FIG. 2.

FIG. 12 shows one type of filter 250 that may be connected to the output of the inverter 240 of FIG. 2. Filter 250 is an LCL filter including two inductors L3 and L4 connected in series and a capacitor C18 connected at one end "a" between the two inductors L3 and L4 and connected at the other end "b" to neutral. The filter 250 removes the undesirable harmonics from each output of the inverter 240 and supplies a filtered AC voltage to the load 155 via the step-down transformer 150.

Figure 13:
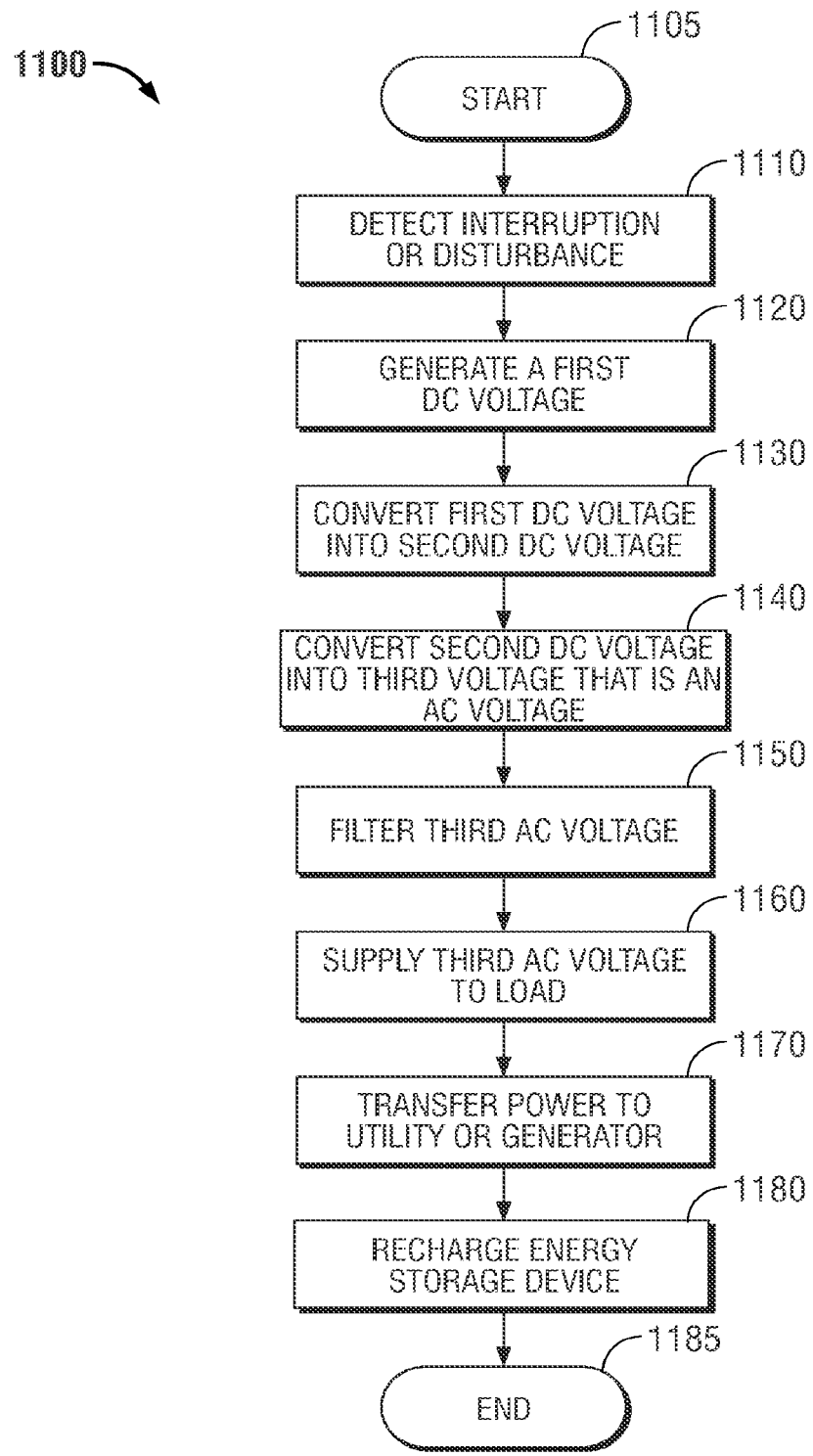
FIG. 13 is a flow diagram of a method for supplying power to a load when an interruption in utility power occurs according to embodiments of the present disclosure.

FIG. 13 is a flow diagram of a process 1100 for supplying power to a load 155 using the UPS system 210 of FIG. 2 or the UPS 600 of FIG. 11. The process 1100 starts at step 1105 when an interruption or disturbance is detected at step 1110. Next, at step 1120, a first DC voltage V1 is generated from an energy storage device 205 using one or more buck-boost converters or one or more standard converters. If the energy storage device 205 supplies a voltage Vs between about 400V and about 1200 V, then the first voltage V1 can be a medium voltage from about 666 V to about 2 kV (with a boost duty ratio of 0.4) when using one buck-boost converter. The first voltage V1 is converted into a second DC voltage V2 at step 1130. The second voltage V2 is a high DC voltage from about 8 kV to about 24 kV when using more than a three-level converter, for example, the five-level converter 220 or 230 shown in FIGS. 3 and 4.

Next, at step 1140, the second voltage V2 is converted into a third voltage V3 that is an AC voltage by the inverter 240. The third voltage V3 is an AC voltage lower than the second voltage V2. For example, when the second voltage V2 is the DC voltage shown in Table 3, e.g., 21 kV DC, and the UPS system 210 includes a five-level inverter 240, then the third voltage V3 is the corresponding AC voltage shown in TABLE 3 on the same row, e.g., 13.8 kV AC.

TABLE 3

| V2 (V DC) | V3 (V AC) |
|---|---|
| 21 kV | 13.8 kV |
| 10 kV | 6.6 kV |
| 5 kV | 3.3 kV |
| 1 kV | 600 V |

In step 1150, the AC or third voltage V3 output from the inverter 240 may pass through a filter, such as the LCL filter 250 shown in FIG. 12, in step 1150. Then, in step 1160, the AC or third voltage V3 is supplied to load 155. After a certain period not exceeding a maximum battery discharge period, e.g., about five minutes, the supply of power from the UPS system 210 is transferred to the generator 160 or the utility supply 165 at step 1170. The generator 160 or the utility supply 165 charges the energy storage device 105 using the bidirectional inverter 240 and converters 230 at step 1180. Alternatively, when a unidirectional converter 230 is used, then a charging apparatus (not shown) must be added to the UPS to charge the energy storage device 105. The process 1100 ends at step 1185 after the generator 160 or the utility supply 165 supplies power to the load 155 and the energy storage device 105 is recharged.

As can be appreciated from the foregoing description, the embodiments of the present disclosure include, for example, referring to FIG. 2, uninterruptible power supply 200 for electrical load 155 that is electrically coupled to step-down transformer 150. The step-down transformer 150 has a desired input voltage. The uninterruptible power supply 210 includes multi-level DC-DC converter 220 or 230 as illustrated in FIGS. 3 and 4, respectively and multi-level inverter 240 having an AC voltage output V3 (see FIG. 7) The multi-level inverter 240 is electrically coupled to the multi-level DC-DC converter 220 or 230. The AC voltage output V3 of the multi-level inverter 240 is greater than or equal to the desired input voltage of the step-down transformer 150 when energy storage device 205, Vs provides power to the multi-level DC-DC converter 220 or 230.

The multi-level DC-DC converter 220 or 230 includes first stage 224 or 224' that generates first output DC voltage V1 and second stage 226 or 226' that generates second output DC voltage V2 that is higher than the first output DC voltage V1.

Referring to FIG. 7, the AC voltage V3 is a medium voltage and is generated without a step-up transformer for stepping up the voltage to a level greater than or equal to the desired input voltage of the step-down transformer 150 supplying power to the electrical load 155.

In one embodiment, referring to FIGS. 2, 3, 4 and 7, the uninterruptible power supply 200 includes energy storage device 205, Vs that is configured to supply first DC voltage V1. Multi-level DC-DC converter 220 or 230 is coupled to the energy storage device 205, Vs and is configured to transform the first DC voltage V1 into second DC voltage V2 that is greater than the first DC voltage V1, and multi-level inverter 240 that is coupled to the multi-level DC-DC converter 220 or 230. The multi-level inverter 240 is configured to convert the second DC voltage V2 into third voltage V3 that is an AC voltage less than the second DC voltage V2.

The UPS system 210 described above eliminates a bulky and expensive transformer that generates considerable losses. Indeed, the UPS system 210 may increase the efficiency of the UPS system 210 by about 0.5% because this transformer may produce energy losses of about 1%. Additionally, transformers are large in size and have a low power density. Therefore, by eliminating the transformer 140, the UPS system 210 has a smaller footprint as well as a higher power density.

The two-stage, bidirectional DC-DC converters described above, e.g., bidirectional DC-DC converters 220, 230, 234, provide higher system efficiency for higher boost ratio operation in comparison to single-stage DC-DC converters. For example, assuming that the energy storage device 105 has a nominal voltage of 1000 V, the boost ratio would be 1:21. The two-stage, bidirectional DC-DC converters also eliminate the need for an external battery charger. Furthermore, the two-stage, bidirectional DC-DC converters allow for the use of existing low voltage (e.g., 700 V to 1200 V) energy storage devices.

The multi-level inverters 240 that are operated according to the SVPWM technique of the UPS system 210 provide better harmonic quality than the two-level inverters 120 that are operated according to a sinusoidal PWM technique. Thus, the requirements of the filters 250 are minimized or eliminated. If the total current harmonics of the inverter output are less than 1%, then there is no need for external filter. The multi-level inverters 240 may be controlled using space-vector PWM, which provides much better harmonic quality than sinusoidal PWM. The multi-level inverters 240 use a lower switching frequency, which results in lower voltage spikes. Therefore, the multi-level inverters 240 generate lower common mode voltages and the UPS system 210 needs lower EMI filtering in comparison to UPS systems using the two-level inverters 120.

The UPS system 210 of the present disclosure may be used across the full voltage spectrum of applications from low-voltage applications to very high voltage applications including medium voltage applications.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A transformerless uninterruptible power supply for an electrical load, comprising:
    an energy storage device;
    a single stage DC-DC converter configured to convert a first DC voltage output from the energy storage device into a second DC voltage higher than the first DC voltage using fixed duty cycle control signals; and
    a multi-level inverter configured to generate a medium AC voltage using space vector PWM control signals so as to perform neutral point voltage balancing,
    wherein a negative terminal of the energy storage device, a negative terminal of the single stage DC-DC converter, and a negative terminal of the multi-level inverter are electrically coupled to a common negative bus.

2. The transformerless uninterruptible power supply according to claim 1, wherein the single stage DC-DC converter includes a plurality of switches that form the levels of the single stage DC-DC converter and a plurality of capacitors coupled together in a flying capacitor topology having a common negative bus.

3. The transformerless uninterruptible power supply according to claim 1, wherein the energy storage device is a high voltage energy storage device.

4. The transformerless uninterruptible power supply according to claim 3, wherein the high voltage energy storage device has a high voltage between about 4 kV and about 7 kV.

5. The transformerless uninterruptible power supply according to claim 1, wherein the energy storage device is a battery, an ultra capacitor, or a battery and an ultra-capacitor electrically coupled to one another.

6. A method for supplying power from a transformerless uninterruptible power supply to an electrical load when an interruption in power occurs, the method comprising:
    supplying a first DC voltage from a low voltage energy storage device to a DC-DC converter;
    converting the first DC voltage into a second DC voltage higher than the first output DC voltage using fixed duty cycle control signals;
    providing the second DC voltage to a multi-level inverter; and
    generating an AC voltage from the second DC voltage using space vector PWM control signals so as to perform neutral point voltage balancing, wherein the AC voltage is a medium voltage less than the second DC voltage.

* * * * *